(12) United States Patent
Kim

(10) Patent No.: US 10,789,551 B2
(45) Date of Patent: Sep. 29, 2020

(54) METHOD FOR TRAINING AND TESTING DATA EMBEDDING NETWORK TO GENERATE MARKED DATA BY INTEGRATING ORIGINAL DATA WITH MARK DATA, AND TRAINING DEVICE AND TESTING DEVICE USING THE SAME

(71) Applicant: Deeping Source Inc., Seoul (KR)

(72) Inventor: Tae Hoon Kim, Seoul (KR)

(73) Assignee: DEEPING SOURCE INC. (KR)

( * ) Notice: Subject to any disclaimer, the term of this patent is extended or adjusted under 35 U.S.C. 154(b) by 0 days.

(21) Appl. No.: 16/513,720

(22) Filed: Jul. 17, 2019

(65) Prior Publication Data
US 2020/0050962 A1 Feb. 13, 2020

(30) Foreign Application Priority Data

Aug. 10, 2018 (KR) .......................... 10-2018-0093747

(51) Int. Cl.
*G06E 1/00* (2006.01)
*G06E 3/00* (2006.01)
(Continued)

(52) U.S. Cl.
CPC .................... *G06N 20/00* (2019.01)

(58) Field of Classification Search
CPC ............ G06N 20/00; G06N 3/02; G06N 3/08; G06N 3/0454; G06N 3/0481;
(Continued)

(56) References Cited

U.S. PATENT DOCUMENTS

2002/0099730 A1\* 7/2002 Brown .................... G06F 16/30
715/256
2006/0269098 A1 11/2006 Ebitani
(Continued)

FOREIGN PATENT DOCUMENTS

CN 101661610 \* 4/2010
JP 2018-106216 A 7/2018
(Continued)

OTHER PUBLICATIONS

Peng et al "A learning-based audio watermarking scheme using kernel Fisher discriminant analysis" (Year: 2013).\*
(Continued)

*Primary Examiner* — Luis A Sitiriche
(74) *Attorney, Agent, or Firm* — Xsensus LLP

(57) ABSTRACT

A method for learning a data embedding network is provided. The method includes steps of: a learning device acquiring and inputting original training data and mark training data into the data embedding network which integrates them and generates marked training data; inputting the marked training data into a learning network which applies a network operation to them and generates 1-st characteristic information, and inputting the original training data into the learning network which applies a network operation to them and generates 2-nd characteristic information; learning the data embedding network such that a data error is minimized, by referring to part of errors referring to the 1-st and the 2-nd characteristic information and errors referring to task specific outputs and their ground truths, and a marked data score is maximized, and learning a discriminator such that a original data score is maximized and the marked data score is minimized.

28 Claims, 5 Drawing Sheets

(51) Int. Cl.
*G06F 15/00* (2006.01)
*G06G 7/00* (2006.01)
*G06N 99/00* (2019.01)
*G06N 20/00* (2019.01)

(58) Field of Classification Search
CPC .... G06N 3/0445; G06N 3/0472; G06N 3/082; G06N 3/084; G06N 5/02; G06N 5/04; G06N 5/046; G06N 7/005; G06K 9/6256; G06K 9/6257; G06K 9/00281; G06K 9/00288; G06K 9/4628; G06K 9/6262; G06K 2009/00644; G06K 9/00201; G06K 9/00228; G06K 9/00248; G06K 9/00268; G06K 9/0063; G06K 9/00765; G06K 9/00805; G06K 9/03; G06K 9/22; G06K 9/3233; G06K 9/4642; G06K 9/6202; G06K 9/6215; G06K 9/6234; G06K 9/627; G06K 9/6271; G06K 9/6289; G06K 9/629; G06K 9/6292; G06F 21/32; G06F 16/90335; G06F 16/904; G06F 17/5009; G06F 2217/16; G06T 2207/20081; G06T 11/001; G06T 11/60; G06T 15/08; G06T 17/20; G06T 2207/10004; G06T 2207/10016; G06T 2207/10024; G06T 2207/10028; G06T 2207/20016; G06T 2207/20084; G06T 2207/20221; G06T 2207/30036; G06T 2207/30096; G06T 2207/30204; G06T 2207/30244; G06T 7/0014; G06T 7/11; G06T 7/194; G06T 7/246; G06T 7/262; G06T 7/44; G06T 7/536; G06T 7/90

See application file for complete search history.

(56) References Cited

U.S. PATENT DOCUMENTS

2015/0055855 A1* 2/2015 Rodriguez ............. G06F 21/16
382/159
2019/0286938 A1* 9/2019 Backhus ................ G06T 17/20

FOREIGN PATENT DOCUMENTS

KR 10-2017-0092631 A 8/2017
KR 10-1861520 B1 5/2018

OTHER PUBLICATIONS

Fu et al "Color image watermarking scheme based on linear discriminant" (Year: 2007).*

* cited by examiner

METHOD FOR TRAINING AND TESTING DATA EMBEDDING NETWORK TO GENERATE MARKED DATA BY INTEGRATING ORIGINAL DATA WITH MARK DATA, AND TRAINING DEVICE AND TESTING DEVICE USING THE SAME

CROSS-REFERENCE TO RELATED APPLICATION

The present application claims priority to KR 10-2018-0093747 filed Aug. 10, 2018, the entire contents of which are incorporated herein by reference.

FIELD OF THE DISCLOSURE

The present disclosure relates to a learning method for learning a data embedding network which integrates original data with mark data, to thereby generate marked data and a learning device using the same, and to a testing method for testing the data embedding network which has been learned to integrate the original data with the mark data, to thereby generate the marked data and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as big data in the sense that common software tools and computer systems cannot handle such a huge volume of data.

And, although such big data may be insignificant by itself, it can be useful for generation of new data, judgment, or prediction in various fields through machine learning on patterns and the like.

Recently, as interest in artificial intelligence technology has increased, trading or sharing of big data which the technology is based on has become active.

However, due to characteristics of the data which is, for example, large and difficult to specify from whom it is provided, once the data is transmitted to a third party, not only is it easy to copy, but also difficult to find out whether it was transmitted to an unauthorized party without a permission. In order to compensate for this, certain identification processes, for example, watermarking techniques, have appeared.

As an example of a related conventional technique, according to a Korean Patent Laid-Open Publication No. 10-2018-0058116, an audio watermark embedding technique is disclosed, including a step of applying an MCLT-conversion to a first audio signal, a step of inserting a bit stream of a watermark into the MCLT-converted first audio signal, a step of applying an IMDCT-conversion to the first audio signal into which the bit stream is inserted, and a step of superimposing the IMDCT-converted signal on a neighboring frame signal to thereby generate a second audio signal which is a signal acquired by embedding the watermark into the first audio signal.

As another example of a related conventional technique, according to a Korean Patent Registration No. 10-1837939, a technique for embedding a watermark into a document is disclosed, including a first step of dividing a document, to which a predetermined color is applied, into a plurality of sections, a second step of selectively inserting the watermark such that the watermarks do not overlap each other in the plurality of sections, and a third step of correcting the watermarked document to match the color of the document to which the predetermined color is applied, to thereby correct the color with correction values according to hiddenness degrees of the watermark.

However, according to the above-described conventional techniques and other techniques published so far, although an identification process allows easy identification of an owner or a provider of the data and prevention of unauthorized distribution, the identification process also incurs damage or alteration to the original data, and thus the processed data is misrecognized or cannot be used during machine learning, deep learning or reinforced learning.

Therefore, the inventors of the present disclosure propose a technique that generates marked data recognized as different from the original data by integrating the original data with mark data, and outputs a result generated by inputting the original data into a machine learning model, which is same as or similar to that generated by inputting the marked data into the learning model.

SUMMARY OF THE DISCLOSURE

It is an object of the present disclosure to solve all the aforementioned problems.

It is another object of the present disclosure to easily identify an origin of a data by processing the data, for example, digitally watermarking the data.

It is still another object of the present disclosure to acquire a result generated by applying machine-learning operation to the processed data acuiqred by inserting mark data into original data, which is same as or similar to that generated by applying the machine-learning operation to the original data.

It is still yet another object of the present disclosure to acquire a result such that the original data and processed data are recognized as different by a human, but recognized as same or similar by a computer.

It is still yet another object of the present disclosure to support trading or sharing data by data providers in a big data trading market.

In accordance with one aspect of the present disclosure, there is provided a method for learning a data embedding network capable of integrating original data with mark data to thereby generate marked data, including steps of: (a) a learning device, if original training data and mark training data are acquired, inputting the original training data and the mark training data into the data embedding network, and allowing the data embedding network to integrate the original training data with the mark training data and thus to generate marked training data; (b) the learning device (i) inputting the marked training data into a learning network having its own one or more learned parameters, and allowing the learning network to (i-1) apply a network operation to the marked training data using the learned parameters and thus to (i-2) generate 1-st characteristic information corresponding to the marked training data, and (ii) inputting the original training data into the learning network, and allowing the learning network to (ii-1) apply a network operation to the original training data using the learned parameters and thus to (ii-2) generate 2-nd characteristic information corresponding to the original training data; and (c) the learning device (c1) learning the data embedding network such that (i) at least one data error is minimized which is calculated by referring to at least part of (i-1) at least one 1-st error acquired by referring to the 1-st characteristic information and the 2-nd characteristic information, and (i-2) at least one 2-nd error acquired by referring to at least one task specific output generated by using the 1-st characteristic information and by further referring to at least one ground truth corresponding to the task specific output, and such that (ii) at least one marked data score is maximized which corresponds to the marked training data inputted into a discriminator for determining whether inputted data is real or fake, and (c2) learning the discriminator such that at least one original data score is maximized which corresponds to the original training data inputted into the discriminator and such that the marked data score is minimized.

As one example, the learning network includes a 1-st learning network to an n-th learning network respectively having one or more 1-st learned parameters to one or more n-th learned parameters wherein n is an integer greater than 0, wherein, at the step of (b), the learning device (i) inputs the marked training data into each of the 1-st learning network to the n-th learning network, and allows each of the 1-st learning network to the n-th learning network to (i-1) apply its corresponding network operation to the marked training data using respectively the 1-st learned parameters to the n-th learned parameters of the 1-st learning network to the n-th learning network, and thus to (i-2) output each piece of (1_1)-st characteristic information to (1_n)-th characteristic information on the marked training data, and (ii) inputs the original training data into each of the 1-st learning network to the n-th learning network, and allows each of the 1-st learning network to the n-th learning network to (ii-1) apply its corresponding network operation to the original training data using respectively the 1-st learned parameters to the n-th learned parameters, and thus to (ii-2) output each piece of (2_1)-st characteristic information to (2_n)-th characteristic information on the original training data, and wherein, at the step of (c), the learning device (i) learns the data embedding network such that the data error is minimized which is calculated by referring to at least part of (i-1) the 1-st error which is an average over a (1_1)-st error to a (1_n)-th error wherein the (1_1)-st error is acquired by referring to the (1_1)-st characteristic information and the (2_1)-st characteristic information, and the (1_n)-th error is acquired by referring to the (1_n)-th characteristic information and the (2_n)-th characteristic information, and (i-2) the 2-nd error which is an average over a (2_1)-st error to a (2_n)-th error wherein the (2_1)-st error is acquired by referring to at least one 1-st task specific output created by using the (1_1)-st characteristic information and by further referring to at least one 1-st ground truth corresponding to the 1-st task specific output, and the (2_n)-th error is acquired by referring to at least one n-th task specific output created by using the (1_n)-th characteristic information and by further referring to at least one n-th ground truth corresponding to the n-th task specific output, and such that the marked data score is maximized which corresponds to the marked training data inputted into the discriminator, and (ii) learns the discriminator such that at least one modified data score or at least one modified marked data score is maximized which corresponds to the training modified data or modified marked training data inputted into the discriminator and that the marked data score is minimized.

As one example, the learning network includes a 1-st learning network to an n-th learning network respectively having one or more 1-st learned parameters to one or more n-th learned parameters wherein n is an integer greater than 0, wherein, at the step of (a), the learning device inputs the original training data and the mark training data into the data embedding network, and allows the data embedding network to integrate the original training data with the mark training data and thus to generate 1-st marked training data, wherein, at the step of (b), the learning device (i) inputs the 1-st marked training data into the 1-st learning network, and allows the 1-st learning network to (i-1) apply a network operation to the 1-st marked training data using the 1-st learned parameters of the 1-st learning network and thus to (i-2) output (1_1)-st characteristic information on the 1-st marked training data, and (ii) inputs the original training data into the 1-st learning network, and allows the 1-st learning network to (ii-1) apply a network operation to the original training data using the 1-st learned parameters and thus to (ii-2) output (2_1)-st characteristic information on the original training data, wherein, at the step of (c), the learning device (c1) learns the data embedding network, such that (i) at least one 1-st data error is minimized which is calculated by referring to at least part of (i-1) at least one (1_1)-st error acquired by referring to the (1_1)-st characteristic information and the (2_1)-st characteristic information, and (i-2) at least one (2_1)-st error acquired by referring to at least one 1-st task specific output generated by using the (1_1)-st characteristic information and by further referring to at least one 1-st ground truth corresponding to the 1-st task specific output, and (ii) at least one 1-st marked data score is maximized which corresponds to the 1-st marked training data inputted into the discriminator, to thereby allow the data embedding network to be a 1-st learned data embedding network, and (c2) learns the discriminator, such that (i) at least one 1-st modified data score or at least one 1-st modified marked data score is maximized which corresponds to the modified training data or the modified marked training data inputted into the discriminator, and that (ii) the 1-st marked data score is minimized, to thereby allow the discriminator to be a 1-st learned discriminator, and wherein, while increasing an integer k from 2 to n, the learning device (i) inputs the original training data and the mark training data into the (k_1)-st learned data embedding network, and allows the (k_1)-st learned data embedding network to integrate the original training data with the mark training data and thus to generate k-th marked training data, (ii) inputs the k-th marked training data into a k-th learning network, and allows the k-th learning network to apply a network operation to the k-th marked training data using one or more k-th learned parameters of the k-th learning network and thus to output (1_k)-th characteristic information corresponding to the k-th marked training data, and inputs the original training data into the k-th learning network, and allows the k-th learning network to apply a network operation to the original training data using the k-th learned parameters and thus to output (2_k)-th characteristic information corresponding to the original training data, (iii) learns a (k_1)-st learned data embedding network, such that at least one k-th data error is minimized which is calculated by referring to at least part of (iii-1) at least one (1_k)-th data error acquired by referring to the (1_k)-th characteristic information and the (2_k)-th characteristic information and (iii-2) at least one (2-k)-th error acquired by referring to at least one k-th task specific output generated by using the (1_k)-th characteristic information and by further referring to at least one k-th ground truth corresponding to the k-th task specific output, and such that at least one k-th marked data score is maximized which corresponds to the k-th marked training data inputted into the (k_1)-st learned discriminator, to thereby allow the (k_1)-st learned data embedding network to be a k-th learned data embedding network, and (iv) learns the (k_1)-st learned discriminator, such that at least one k-th modified data score or at least one k-th modified marked data score is maximized which corresponds to the modified training data or the modified marked training data inputted into the (k_1)-st learned discriminator and that the k-th marked data score is minimized, to thereby allow the (k_1)-st learned discriminator to be a k-th learned discriminator.

As one example, a maximum of the modified data score or the modified marked data score corresponding to the modified training data or the modified marked training data inputted into the discriminator is 1 as a value for determining the original training data as real, and a minimum of the marked data score corresponding to the marked training data inputted into the discriminator is 0 as a value for determining the marked training data as fake.

As one example, at the step of (c), the learning device acquires the 1-st error by referring to difference between the 1-st characteristic information and the 2-nd characteristic information, and acquires the 2-nd error by referring to at least one loss created by using the task specific output and the ground truth.

As one example, the learning device acquires the 1-st error by referring to a norm or a cosine similarity between the 1-st characteristic information and the 2-nd characteristic information.

As one example, at the step of (c), the learning device learns the data embedding network by further referring to a similarity between the original training data and the marked training data, such that the similarity is minimized.

In accordance with another aspect of the present disclosure, there is provided a method for testing a learned data embedding network capable of integrating original data with mark data to thereby generate marked data, including steps of: (a) a testing device performing, on condition that a learning device has performed processes of (i) if original training data and mark training data have been acquired, inputting the original training data and the mark training data into a data embedding network, and allowing the data embedding network to integrate the original training data and the mark training data and thus to generate marked training data, (ii) inputting the marked training data into a learning network having its own learned parameters, and allowing the learning network to apply a network operation to the marked training data using the learned parameters and thus to generate 1-st characteristic information corresponding to the marked training data, and inputting the original training data into the learning network, and allowing the learning network to apply a network operation to the original training data using the learned parameters and thus to output 2-nd characteristic information corresponding to the original training data, (iii) learning the data embedding network, such that at least one data error is minimized which is calculated by referring to at least part of (iii-1) at least one 1-st error acquired by referring to the 1-st characteristic information and the 2-st characteristic information and (iii-2) at least one 2-nd error acquired by referring to at least one task specific output generated by using the 1-st characteristic information and by further referring to at least one ground truth corresponding to the task specific output and such that at least one marked data score is maximized which corresponds to the marked training data inputted into a discriminator for determining whether inputted data is real or fake, and (iv) learning the discriminator such that at least one modified data score or at least one modified marked data score is maximized which corresponds to modified training data or modified marked training data inputted into the discriminator and such that the marked data score is minimized wherein the modified training data or the modified marked training data is generated respectively by modifying the original training data or the marked training data, a process of acquiring original test data and mark test data to be integrated; and (b) the testing device inputting the original test data and the mark test data into the data embedding network, and allowing the data embedding network to integrate the original test data with the mark test data using one or more learned parameters of the data embedding network and thus to generate marked test data.

As one example, at the step of (a), the learning network includes a 1-st learning network to an n-th learning network respectively having one or more 1-st learned parameters to one or more n-th learned parameters wherein n is an integer greater than 0, and wherein, the learning device has performed processes of (i) inputting the marked training data into each of a 1-st learning network to an n-th learning network, and allowing each of the 1-st learning network to the n-th learning network to (i-1) apply its corresponding network operation to the marked training data using respectively one or more 1-st learned parameters to one or more n-th learned parameters of the 1-st learning network to the n-th learning network, and thus to (i-2) output each piece of (1_1)-st characteristic information to (1_n)-th characteristic information corresponding to the marked training data, and (ii) inputting the original training data into each of the 1-st learning network to the n-th learning network, and allowing each of the 1-st learning network to the n-th learning network to (ii-1) apply its corresponding network operation to the original training data using respectively the 1-st learned parameters to the n-th learned parameters of the 1-st learning network to the n-th learning network, and thus to (ii-2) output each piece of (2_1)-st characteristic information to (2_n)-th characteristic information corresponding to the original training data, (iii) learning the data embedding network such that (iii-1) the data error is minimized which is calculated by referring to at least part of (iii-1a) the 1-st error which is an average over at least one (1_1)-st error to at least one (1_n)-th error wherein the (1_1)-st error is acquired by referring to the (1_1)-st characteristic information and the (2_1)-st characteristic information, and the (1_n)-th error is acquired by referring to (1_n)-th characteristic information and (2_n)-th characteristic information, and (iii-1b) the 2-nd error which is an average over a (2_1)-st error to a (2_n)-th error wherein the (2_1)-st error is acquired by referring to at least one 1-st task specific output created by using the (1_1)-st characteristic information and by further referring to at least one 1-st ground truth corresponding to the 1-st task specific output, and the (2_n)-th error is acquired by referring to at least one n-th task specific output created by using the (1_n)-th characteristic information and by further referring to at least one n-th ground truth corresponding to the n-th task specific output, and such that (iii-2) the marked data score is maximized which corresponds to the marked training data inputted into the discriminator, and (iv) learning the discriminator such that the modified data score or the modified marked data score is maximized which corresponds to the modified training data or the modified marked training data inputted into the discriminator, and such that the marked data score is minimized.

As one example, at the step of (a), the learning network includes a 1-st learning network to an n-th learning network respectively having one or more 1-st learned parameters to one or more n-th learned parameters wherein n is an integer greater than 0, and the learning device has performed processes of (i) inputting the original training data and the mark training data into the data embedding network, and allowing the data embedding network to integrate the original training data and the mark training data, and thus to generate 1-st marked training data, (ii) inputting the 1-st marked training data into the 1-st learning network, and allowing the 1-st learning network to apply a network operation to the 1-st marked training data using the 1-st learned parameters of the 1-st learning network and thus to output the (1_1)-st characteristic information corresponding to the 1-st marked training data, and inputting the original training data into the 1-st learning network, and allowing the 1-st learning network to apply a network operation to the original training data using the 1-st learned parameters of the 1-st learning network, and thus to output the (2_1)-st characteristic information corresponding to the original training data, (iii) learning the data embedding network, such that the 1-st data error is minimized which is calculated by referring to at least part of (iii-1) the (1_1)-st error acquired by referring to the (1_1)-st characteristic information and the (2_1)-st characteristic information, and (iii-2) the (2_1)-st error acquired by referring to the 1-st task specific output created by using the (1_1)-st characteristic information and by further referring to the 1-st ground truth corresponding to the 1-st task specific output and such that the 1-st marked data score is maximized which corresponds to the 1-st marked training data inputted into the discriminator, to thereby allow the data embedding network to be a 1-st learned data embedding network, (iv) learning the discriminator, such that at least one 1-st modified data score or at least one 1-st modified marked data score is maximized which respectively corresponds to the modified training data or the modified marked training data inputted into the discriminator and such that the 1-st marked data score is minimized, to thereby allow the discriminator to be a 1-st learned discriminator, (v) while increasing an integer k from 2 to n, (v≤1) inputting the original training data and the mark training data into a (k_1)-st learned data embedding network, and allowing the (k_1)-st learned data embedding network to integrate the original training data with the mark training data and thus to generate k-th marked training data, (v≤2) inputting the k-th marked training data into a k-th learning network, and allowing the k-th learning network to apply a network operation to the k-th marked training data using one or more k-th learned parameters of the k-th learning network and thus to output (1_k)-th characteristic information corresponding to the k-th marked training data, and inputting the original training data into the k-th learning network, and allowing the k-th learning network to apply a network operation to the original training data using the k-th learned parameters and thus to output (2_k)-th characteristic information corresponding to the original training data, (v≤3) learning a (k_1)-st learned data embedding network, such that at least one k-th data error is minimized which is calculated by referring to at least part of (v≤3-1) at least one (1_k)-th data error acquired by referring to the (1_k)-th characteristic information and the (2_k)-th characteristic information and (v≤3-2) at least one (2-k)-th error acquired by referring to at least one k-th task specific output generated by using the (1_k)-th characteristic information and by further referring to at least one k-th ground truth corresponding to the k-th task specific output, and such that at least one k-th marked data score is maximized which corresponds to the k-th marked training data inputted into a (k_1)-st learned discriminator, to thereby allow the (k_1)-st learned data embedding network to be a k-th learned data embedding network, and (v≤4) learning the (k_1)-st learned discriminator, such that at least one k-th modified data score or at least one k-th modified marked data score is maximized which respectively corresponds to the modified training data or the modified marked training data inputted into the (k_1)-st learned discriminator and such that the k-th marked data score is minimized, to thereby allow the (k_1)-st learned discriminator to be a k-th learned discriminator.

As one example, a maximum of the modified data score or the modified marked data score respectively corresponding to the modified training data or the modified marked training data inputted into the discriminator is 1 as a value for determining the modified training data or the modified marked training data as real, and a minimum of the marked data score corresponding to the marked training data inputted into the discriminator is 0 as a value for determining the marked training data as fake.

As one example, the learning device has acquired the 1-st error by referring to difference between the 1-st characteristic information and the 2-nd characteristic information, and has acquired the 2-nd error by referring to at least one loss created by using the task specific output and the ground truth.

As one example, the learning device has acquired the 1-st error by referring to a norm or a cosine similarity between the 1-st characteristic information and the 2-nd characteristic information.

As one example, the learning device has learned the data embedding network by further referring to a similarity between the original training data and the marked training data, such that the similarity is minimized.

In accordance with still another aspect of the present disclosure, there is provided a learning device for learning a data embedding network capable of integrating original data with mark data to thereby generate marked data, including: at least one memory that stores instructions; and at least one processor configured to execute the instructions to perform or support another device to perform processes of: (I) if original training data and mark training data are acquired, inputting the original training data and the mark training data into the data embedding network, and allowing the data embedding network to integrate the original training data with the mark training data and thus to generate marked training data, (II) (i) inputting the marked training data into a learning network having its own one or more learned parameters, and allowing the learning network to (i-1) apply a network operation to the marked training data using the learned parameters and thus to (i-2) generate 1-st characteristic information corresponding to the marked training data, and (ii) inputting the original training data into the learning network, and allowing the learning network to (ii-1) apply a network operation to the original training data using the learned parameters and thus to (ii-2) generate 2-nd characteristic information corresponding to the original training data, and (III) (III-1) learning the data embedding network such that (i) at least one data error is minimized which is calculated by referring to at least part of (i-1) at least one 1-st error acquired by referring to the 1-st characteristic information and the 2-nd characteristic information, and (i-2) at least one 2-nd error acquired by referring to at least one task specific output generated by using the 1-st characteristic information and by further referring to at least one ground truth corresponding to the task specific output, and such that (ii) at least one marked data score is maximized which corresponds to the marked training data inputted into a discriminator for determining whether inputted data is real or fake, and (III-2) learning the discriminator such that at least one modified data score or at least one modified marked data score is maximized which respectively corresponds to modified training data or modified marked training data inputted into the discriminator and such that the marked data score is minimized wherein the modified training data or the modified marked training data is generated by modifying the original training data or the marked training data.

As one example, the learning network includes a 1-st learning network to an n-th learning network respectively having one or more 1-st learned parameters to one or more n-th learned parameters wherein n is an integer greater than 0, wherein, at the process of (II), the processor (i) inputs the marked training data into each of the 1-st learning network to the n-th learning network, and allows each of the 1-st learning network to the n-th learning network to (i-1) apply its corresponding network operation to the marked training data using respectively the 1-st learned parameters to the n-th learned parameters of the 1-st learning network to the n-th learning network, and thus to (i-2) output each piece of (1_1)-st characteristic information to (1_n)-th characteristic information on the marked training data, and (ii) inputs the original training data into each of the 1-st learning network to the n-th learning network, and allows each of the 1-st learning network to the n-th learning network to (ii-1) apply its corresponding network operation to the original training data using respectively the 1-st learned parameters to the n-th learned parameters, and thus to (ii-2) output each piece of (2_1)-st characteristic information to (2_n)-th characteristic information on the original training data, and wherein, at the process of (III), the processor (i) learns the data embedding network such that the data error is minimized which is calculated by referring to at least part of (i-1) the 1-st error which is an average over a (1_1)-st error to a (1_n)-th error wherein the (1_1)-st error is acquired by referring to the (1_1)-st characteristic information and the (2_1)-st characteristic information, and the (1_n)-th error is acquired by referring to the (1_n)-th characteristic information and the (2_n)-th characteristic information, and (i-2) the 2-nd error which is an average over a (2_1)-st error to a (2_n)-th error wherein the (2_1)-st error is acquired by referring to at least one 1-st task specific output created by using the (1_1)-st characteristic information and by further referring to at least one 1-st ground truth corresponding to the 1-st task specific output, and the (2_n)-th error is acquired by referring to at least one n-th task specific output created by using the (1_n)-th characteristic information and by further referring to at least one n-th ground truth corresponding to the n-th task specific output, and such that the marked data score is maximized which corresponds to the marked training data inputted into the discriminator, and (ii) learns the discriminator such that the modified data score or the modified marked data score is maximized which respectively corresponds to the modified training data or the modified marked training data inputted into the discriminator and that the marked data score is minimized.

As one example, the learning network includes a 1-st learning network to an n-th learning network respectively having one or more 1-st learned parameters to one or more n-th learned parameters wherein n is an integer greater than 0, wherein, at the process of (I), the processor inputs the original training data and the mark training data into the data embedding network, and allows the data embedding network to integrate the original training data with the mark training data and thus to generate 1-st marked training data, wherein, at the process of (II), the processor (i) inputs the 1-st marked training data into the 1-st learning network, and allows the 1-st learning network to (i-1) apply a network operation to the 1-st marked training data using the 1-st learned parameters of the 1-st learning network and thus to (i-2) output (1_1)-st characteristic information on the 1-st marked training data, and (ii) inputs the original training data into the 1-st learning network, and allows the 1-st learning network to (ii-1) apply a network operation to the original training data using the 1-st learned parameters and thus to (ii-2) output (2_1)-st characteristic information on the original training data, wherein, at the process of (III), the processor (III-1) learns the data embedding network, such that (i) at least one 1-st data error is minimized which is calculated by referring to at least part of (i-1) at least one (1_1)-st error acquired by referring to the (1_1)-st characteristic information and the (2_1)-st characteristic information, and (i-2) at least one (2_1)-st error acquired by referring to at least one 1-st task specific output generated by using the (1_1)-st characteristic information and by further referring to at least one 1-st ground truth corresponding to the 1-st task specific output, and (ii) at least one 1-st marked data score is maximized which corresponds to the 1-st marked training data inputted into the discriminator, to thereby allow the data embedding network to be a 1-st learned data embedding network, and (III-2) learns the discriminator, such that (i) at least one 1-st modified data score or at least one 1-st modified marked data score is maximized which respectively corresponds to the modified training data or the modified marked training data inputted into the discriminator, and that (ii) the 1-st marked data score is minimized, to thereby allow the discriminator to be a 1-st learned discriminator, and wherein, while increasing an integer k from 2 to n, the processor (i) inputs the original training data and the mark training data into the (k_1)-st learned data embedding network, and allows the (k_1)-st learned data embedding network to integrate the original training data with the mark training data and thus to generate k-th marked training data, (ii) inputs the k-th marked training data into a k-th learning network, and allows the k-th learning network to apply a network operation to the k-th marked training data using one or more k-th learned parameters of the k-th learning network and thus to output (1_k)-th characteristic information corresponding to the k-th marked training data, and inputs the original training data into the k-th learning network, and allows the k-th learning network to apply a network operation to the original training data using the k-th learned parameters and thus to output (2_k)-th characteristic information corresponding to the original training data, (iii) learns a (k_1)-st learned data embedding network, such that at least one k-th data error is minimized which is calculated by referring to at least part of (iii-1) at least one (1_k)-th data error acquired by referring to the (1_k)-th characteristic information and the (2_k)-th characteristic information and (iii-2) at least one (2-k)-th error acquired by referring to at least one k-th task specific output generated by using the (1_k)-th characteristic information and by further referring to at least one k-th ground truth corresponding to the k-th task specific output, and such that at least one k-th marked data score is maximized which corresponds to the k-th marked training data inputted into the (k_1)-st learned discriminator, to thereby allow the (k_1)-st learned data embedding network to be a k-th learned data embedding network, and (iv) learns the (k_1)-st learned discriminator, such that at least one k-th modified data score or at least one k-th modified marked data score is maximized which respectively corresponds to the modified training data or the modified marked training data inputted into the (k_1)-st learned discriminator and that the k-th marked data score is minimized, to thereby allow the (k_1)-st learned discriminator to be a k-th learned discriminator.

As one example, a maximum of the modified data score or the modified marked data score corresponding to the modified training data or the modified marked training data inputted into the discriminator is 1 as a value for determining the modified training data or the modified marked training data as real, and a minimum of the marked data score corresponding to the marked training data inputted into the discriminator is 0 as a value for determining the marked training data as fake.

As one example, at the process of (III), the processor acquires the 1-st error by referring to difference between the 1-st characteristic information and the 2-nd characteristic information, and acquires the 2-nd error by referring to at least one loss created by using the task specific output and the ground truth.

As one example, the processor acquires the 1-st error by referring to a norm or a cosine similarity between the 1-st characteristic information and the 2-nd characteristic information.

As one example, at the process of (III), the processor learns the data embedding network by further referring to a similarity between the original training data and the marked training data, such that the similarity is minimized.

In accordance with still yet another aspect of the present disclosure, there is provided a testing device for testing a learned data embedding network capable of integrating original data with mark data to thereby generate marked data, including: at least one memory that stores instructions; and at least one processor configured to execute the instructions to perform or support another device to perform processes of: (I) on condition that a learning device has performed processes of (i) if original training data and mark training data have been acquired, inputting the original training data and the mark training data into a data embedding network, and allowing the data embedding network to integrate the original training data and the mark training data and thus to generate marked training data, (ii) inputting the marked training data into a learning network having its own learned parameters, and allowing the learning network to apply a network operation to the marked training data using the learned parameters and thus to generate 1-st characteristic information corresponding to the marked training data, and inputting the original training data into the learning network, and allowing the learning network to apply a network operation to the original training data using the learned parameters and thus to output 2-nd characteristic information corresponding to the original training data, (iii) learning the data embedding network, such that at least one data error is minimized which is calculated by referring to at least part of (iii-1) at least one 1-st error acquired by referring to the 1-st characteristic information and the 2-st characteristic information and (iii-2) at least one 2-nd error acquired by referring to at least one task specific output generated by using the 1-st characteristic information and by further referring to at least one ground truth corresponding to the task specific output and such that at least one marked data score is maximized which corresponds to the marked training data inputted into a discriminator for determining whether inputted data is real or fake, and (iv) learning the discriminator such that at least one modified data score or at least one modified marked data score is maximized which corresponds to modified training data or modified marked training data inputted into the discriminator and such that the marked data score is minimized wherein the modified training data or the modified marked training data is respectively generated by modifying the original training data or the marked training data, a process of acquiring original test data and mark test data to be integrated; and (II) inputting the original test data and the mark test data into the data embedding network, and allowing the data embedding network to integrate the original test data with the mark test data using one or more learned parameters of the data embedding network and thus to generate marked test data.

As one example, at the process of (I), the learning network includes a 1-st learning network to an n-th learning network respectively having one or more 1-st learned parameters to one or more n-th learned parameters wherein n is an integer greater than 0, and wherein, the learning device has performed processes of (i) inputting the marked training data into each of a 1-st learning network to an n-th learning network, and allowing each of the 1-st learning network to the n-th learning network to (i-1) apply its corresponding network operation to the marked training data using respectively one or more 1-st learned parameters to one or more n-th learned parameters of the 1-st learning network to the n-th learning network, and thus to (i-2) output each piece of (1_1)-st characteristic information to (1_n)-th characteristic information corresponding to the marked training data, and (ii) inputting the original training data into each of the 1-st learning network to the n-th learning network, and allowing each of the 1-st learning network to the n-th learning network to (ii-1) apply its corresponding network operation to the original training data using respectively the 1-st learned parameters to the n-th learned parameters of the 1-st learning network to the n-th learning network, and thus to (ii-2) output each piece of (2_1)-st characteristic information to (2_n)-th characteristic information corresponding to the original training data, (iii) learning the data embedding network such that (iii-1) the data error is minimized which is calculated by referring to at least part of (iii-1a) the 1-st error which is an average over at least one (1_1)-st error to at least one (1_n)-th error wherein the (1_1)-st error is acquired by referring to the (1_1)-st characteristic information and the (2_1)-st characteristic information, and the (1_n)-th error is acquired by referring to (1_n)-th characteristic information and (2_n)-th characteristic information, and (iii-1b) the 2-nd error which is an average over a (2_1)-st error to a (2_n)-th error wherein the (2_1)-st error is acquired by referring to at least one 1-st task specific output created by using the (1_1)-st characteristic information and by further referring to at least one 1-st ground truth corresponding to the 1-st task specific output, and the (2_n)-th error is acquired by referring to at least one n-th task specific output created by using the (1_n)-th characteristic information and by further referring to at least one n-th ground truth corresponding to the n-th task specific output, and such that (iii-2) the marked data score is maximized which corresponds to the marked training data inputted into the discriminator, and (iv) learning the discriminator such that the modified data score or the modified marked data score is maximized which corresponds to the modified training data or the modified marked training data inputted into the discriminator, and such that the marked data score is minimized.

As one example, at the process of (I), the learning network includes a 1-st learning network to an n-th learning network respectively having one or more 1-st learned parameters to one or more n-th learned parameters wherein n is an integer greater than 0, and the learning device has performed processes of (i) inputting the original training data and the mark training data into the data embedding network, and allowing the data embedding network to integrate the original training data and the mark training data, and thus to generate 1-st marked training data, (ii) inputting the 1-st marked training data into the 1-st learning network, and allowing the 1-st learning network to apply a network operation to the 1-st marked training data using the 1-st learned parameters of the 1-st learning network and thus to output the (1_1)-st characteristic information corresponding to the 1-st marked training data, and inputting the original training data into the 1-st learning network, and allowing the 1-st learning network to apply a network operation to the original training data using the 1-st learned parameters of the 1-st learning network, and thus to output the (2_1)-st characteristic information corresponding to the original training data, (iii) learning the data embedding network, such that the 1-st data error is minimized which is calculated by referring to at least part of (iii-1) the (1_1)-st error acquired by referring to the (1_1)-st characteristic information and the (2_1)-st characteristic information, and (iii-2) the (2_1)-st error acquired by referring to the 1-st task specific output created by using the (1_1)-st characteristic information and by further referring to the 1-st ground truth corresponding to the 1-st task specific output and such that the 1-st marked data score is maximized which corresponds to the 1-st marked training data inputted into the discriminator, to thereby allow the data embedding network to be a 1-st learned data embedding network, (iv) learning the discriminator, such that the 1-st original data score is maximized which corresponds to the original training data inputted into the discriminator and such that the 1-st marked data score is minimized, to thereby allow the discriminator to be a 1-st learned discriminator, (v) while increasing an integer k from 2 to n, (v≤1) inputting the original training data and the mark training data into a (k_1)-st learned data embedding network, and allowing the (k_1)-st learned data embedding network to integrate the original training data with the mark training data and thus to generate k-th marked training data, (v≤2) inputting the k-th marked training data into a k-th learning network, and allowing the k-th learning network to apply a network operation to the k-th marked training data using one or more k-th learned parameters of the k-th learning network and thus to output (1_k)-th characteristic information corresponding to the k-th marked training data, and inputting the original training data into the k-th learning network, and allowing the k-th learning network to apply a network operation to the original training data using the k-th learned parameters and thus to output (2_k)-th characteristic information corresponding to the original training data, (v≤3) learning a (k_1)-st learned data embedding network, such that at least one k-th data error is minimized which is calculated by referring to at least part of (v≤3-1) at least one (1_k)-th data error acquired by referring to the (1_k)-th characteristic information and the (2_k)-th characteristic information and (v≤3-2) at least one (2-k)-th error acquired by referring to at least one k-th task specific output generated by using the (1_k)-th characteristic information and by further referring to at least one k-th ground truth corresponding to the k-th task specific output, and such that at least one k-th marked data score is maximized which corresponds to the k-th marked training data inputted into a (k_1)-st learned discriminator, to thereby allow the (k_1)-st learned data embedding network to be a k-th learned data embedding network, and (v≤4) learning the (k_1)-st learned discriminator, such that at least one k-th modified data score or at least one k-th modified marked data score is maximized which corresponds to the modified training data or the modified marked training data inputted into the (k_1)-st learned discriminator and such that the k-th marked data score is minimized, to thereby allow the (k_1)-st learned discriminator to be a k-th learned discriminator.

As one example, a maximum of the modified data score or the modified marked data score corresponding to the modified training data or the modified marked training data inputted into the discriminator is 1 as a value for determining the modified training data or the modified marked training data as real, and a minimum of the marked data score corresponding to the marked training data inputted into the discriminator is 0 as a value for determining the marked training data as fake.

As one example, the learning device has acquired the 1-st error by referring to difference between the 1-st characteristic information and the 2-nd characteristic information, and has acquired the 2-nd error by referring to at least one loss created by using the task specific output and the ground truth.

As one example, the learning device has acquired the 1-st error by referring to a norm or a cosine similarity between the 1-st characteristic information and the 2-nd characteristic information.

As one example, the learning device has learned the data embedding network by further referring to a similarity between the original training data and the marked training data, such that the similarity is minimized.

In addition, recordable media that are readable by a computer for storing a computer program to execute the method of the present disclosure are further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
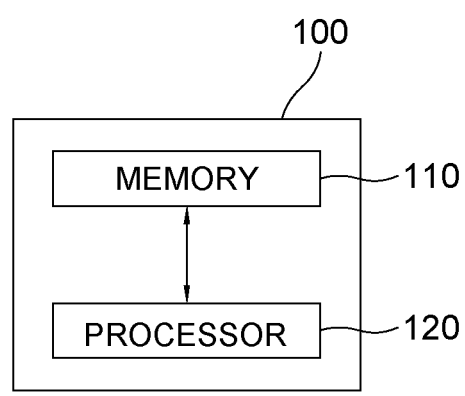
FIG. 1 is a drawing schematically illustrating a learning device for learning a data embedding network capable of generating marked data by integrating original data with mark data in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

To allow those skilled in the art to carry out the present disclosure easily, the example embodiments of the present disclosure will be explained in detail as shown below by referring to attached drawings.

FIG. 1 is a drawing schematically illustrating a learning device for learning a data embedding network capable of generating marked data by integrating original data with mark data in accordance with one example embodiment of the present disclosure.

By referring to FIG. 1, the learning device 100 in accordance with one example embodiment of the present disclosure may include a memory 110 for storing instructions to learn the data embedding network capable of generating marked training data by using original training data and mark training data, such that a learning network outputs a result calculated by using the marked training data, which is same as or similar to that calculated by using the original training data, and a processor 120 for performing processes to learn the data embedding network according to the instructions in the memory 110. Herein, the marked data, the marked training data, marked test data, etc. may mean the data which have been digitally watermarked by using the mark data as a watermark.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, if the original training data and the mark training data are acquired, according to the instructions stored in the memory 110, the processor 120 of the learning device 100 may input the original training data and the mark training data into the data embedding network, to thereby allow the data embedding network to integrate the original training data with the mark training data and thus to generate the marked training data. And, the learning device 100 may perform or support another device to perform processes of (i) inputting the marked training data into the learning network having its own one or more learned parameters, and allowing the learning network to (i-1) apply a network operation to the marked training data using the learned parameters and thus to (i-2) generate 1-st characteristic information corresponding to the marked training data, and (ii) inputting the original training data into the learning network, and allowing the learning network to (ii-1) apply a network operation to the original training data using the learned parameters and thus to (ii-2) generate 2-nd characteristic information corresponding to the original training data. Thereafter, the learning device 100 may (I) learn the data embedding network such that (i) at least one data error is minimized which is calculated by referring to at least part of (i-1) at least one 1-st error acquired by referring to the 1-st characteristic information and the 2-nd characteristic information, and (i-2) at least one 2-nd error acquired by referring to at least one task specific output generated by using the 1-st characteristic information and by further referring to at least one ground truth corresponding to the task specific output, and such that (ii) at least one marked data score is maximized which corresponds to the marked training data inputted into a discriminator for determining whether inputted data is real or fake, and (II) learn the discriminator such that at least one modified data score or at least one modified marked data score is maximized which corresponds to modified training data or modified marked training data inputted into the discriminator and such that the marked data score is minimized.

A method for learning the data embedding network which generates the marked training data by integrating the original training data with the mark training data using the learning device 100 in accordance with one example embodiment of the present disclosure is described by referring to FIGS. 2 and 3 as follows.

Figure 2:
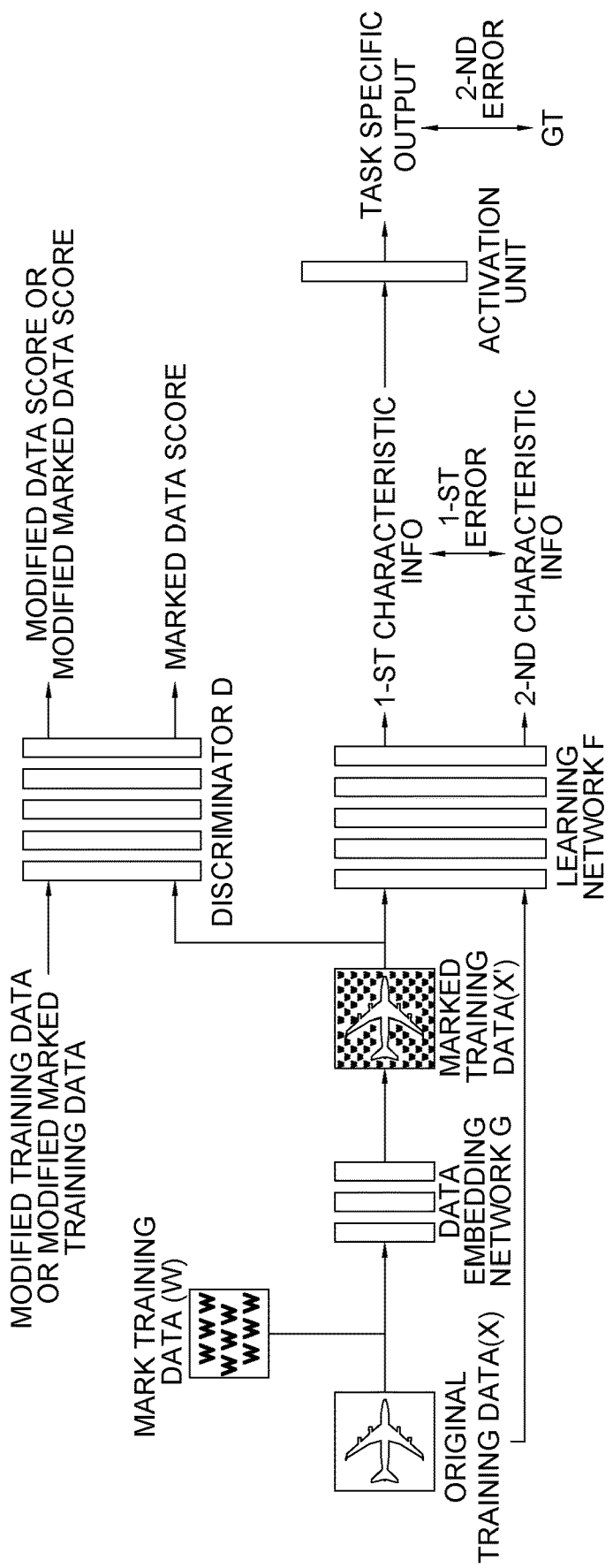
FIG. 2 is a drawing schematically illustrating a learning method for learning the data embedding network capable of generating the marked data by integrating the original data with the mark data in accordance with one example embodiment of the present disclosure.

FIG. 2 is a drawing schematically illustrating a learning method for learning the data embedding network capable of generating the marked training data by integrating the original training data with the mark training data in accordance with one example embodiment of the present disclosure. Although a watermark, i.e., the mark training data w, in accordance with the present disclosure is shown only in a background within the marked training data x', the scope of the present disclosure is not limited thereto, and the watermark may be placed on a shadow of a foreground or anywhere in the marked training data x'.

First, if the original training data x and the mark training data w are acquired, the learning device 100 may input the original training data x and the mark training data w into the data embedding network G, and allow the data embedding network G to integrate the original training data x with the mark training data w and thus to generate marked training data x', i.e., G(x,w).

Herein, the original training data x may include various data such as text, image, video, sound.

And, the mark training data w may include digital watermarks such as watermarks, forensic watermarks, etc. recognizable by at least one of visual, auditory, and haptic sense of a human. And, the digital watermarks may include a robust watermark for proving and protecting copyright of the original data, a fragile watermark for proving and protecting the original data, a fingerprint having unique information, and a steganography for hiding or disguising information, but the scope of the present disclosure is not limited thereto, and may include any types of watermarks like audio watermarks, etc., that can be incorporated into the original data. Also, the mark data w may include information on a right holder related to the original data, for example, may include information on a producer, a distributor, or a receiver of the original data, information on a production date, a distribution date, or a receiving date, information on rights and permissions given to the original data, etc.

Meanwhile, to prevent the original training data x from being extracted from the marked training data x' by isolating the mark training data w, the data embedding network G may use an embedding function G(x,w) to add certain perturbation when integrating the original training data x and the mark training data w.

That is, the data embedding network G may determine types or degrees of transformation to be used in the embedment by referring to types of the original training data such as image, sound, etc. and to characteristics of the original data such as pixels, wave frequencies, etc.

For example, if the original training data x is image data, the data embedding network G may determine pixel-based blending factors and degrees of spatial distortion at sub-pixel levels, for the perturbation, and may transform mark training data w according to the determined degrees of the spatial distortion and integrate the mark training data w with the original training data x.

Also, the data embedding network G may determine random perturbation to be added to the mark training data w based on a certain cryptography hash value extracted from the original training data x, and transform the mark training data w according to the determined random perturbation, and integrate the mark training data w with the original training data x.

And, the marked training data x' may be recognized as data different from the original training data x by a human, but may be recognized as data similar or same as the original training data x by the learning network.

Next, the learning device 100 may perform or support another device to perform processes of (i) inputting the marked training data x' into the learning network F having its own one or more learned parameters, and allowing the learning network F to (i-1) apply a network operation to the marked training data x' using the learned parameters and thus to (i-2) generate 1-st characteristic information F(x') corresponding to the marked training data x', and (ii) inputting the original training data x into the learning network F, and allowing the learning network F to (ii-1) apply a network operation to the original training data x using the learned parameters and thus to (ii-2) generate 2-nd characteristic information F(x) corresponding to the original training data x.

Herein, the learning network F may include a machine learning network, but the scope of the present disclosure is not limited thereto, and may include any learning networks capable of, using their own learned parameters, generating the 1-st characteristic information F(x') by applying a network operation to the marked training data x', and generating the 2-nd characteristic information F(x) by applying a network operation to the original training data x. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

And, the 1-st characteristic information F(x') and the 2-nd characteristic information F(x) may be features or logits respectively corresponding to the marked training data x' and the original training data x. Also, the 1-st characteristic information F(x') and the 2-nd characteristic information F(x) may be feature values related to certain features respectively in the marked training data x' and the original training data x, or the logits including values related to at least one of vectors, matrices, and coordinates related to the certain features. For example, if the training data x are facial image data, the result above may be classes for face recognition, facial features, e.g., laughing expressions, coordinates of facial landmark points, e.g., both end points on far sides of an eye.

Next, the learning device 100 may (I) learn the data embedding network G such that (i) at least one data error is minimized which is calculated by referring to at least part of (i-1) at least one 1-st error acquired by referring to the 1-st characteristic information F(x') and the 2-nd characteristic information F(x), and (i-2) at least one 2-nd error acquired by referring to at least one task specific output generated by using the 1-st characteristic information F(x') and by further referring to at least one ground truth corresponding to the task specific output, and such that (ii) at least one marked data score is maximized which corresponds to the marked training data x' inputted into the discriminator D for determining whether the inputted data is real or fake, and (II) learn the discriminator D such that at least one modified data score or at least one modified marked data score is maximized which corresponds to the modified training data or the modified marked training data inputted into the discriminator D and such that the marked data score is minimized. Herein, the modified training data or the modified marked training data may be generated by adding at least one random noise created through a random noise generating network (not illustrated) to the original training data x or the marked training data x'. As one example, the random noise generating network may be instructed to generate the random noise having a normal distribution N (0, σ), and the generated noise may be added to the original training data x or the marked training data x', to thereby generate the modified training data or the modified marked training data. Also, the modified training data or the modified marked training data may be generated by blurring the original training data x or the marked training data x', or changing a resolution of the original training data x or the marked training data x', but the scope of the present disclosure is not limited thereto, and various ways of modifying the original training data or the marked training data may be used.

That is, the learning device 100 may learn the data embedding network G to allow the learning network F to output the marked training data x' by integrating the original training data x with the mark training data w by using the 1-st error such that the marked training data x' is recognized as same as or similar to the original training data x, and such that the learning network F outputs, by using the marked data score, the marked training data x' which is different from the original training data x but difficult to differentiate from the original training data x.

Herein, the learning device 100 may acquire the 1-st error by referring to a difference between the 1-st characteristic information F(x') and the 2-nd characteristic information F(x) and may acquire the 2-nd error by referring to at least one loss calculated by using the task specific output and its corresponding ground truth.

As one example, the learning device 100 may acquire the 1-st error by referring to a norm or a cosine similarity between the 1-st characteristic information F(x') and the 2-nd characteristic information F(x), but the scope of the present disclosure is not limited thereto, and any various algorithms capable of calculating difference between the 1-st characteristic information F(x') and the 2-nd characteristic information F(x) may be used.

And, the task specific output may be an output of a task to be performed by the learning network F, and may have various results according to the task learned by the learning network F, such as a probability of a class for classification, coordinates resulting from regression for location detection, etc., and an activation function of an activation unit may be applied to characteristic information outputted from the learning network F, to thereby generate the task specific output according to the task to be performed by the learning network F. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the learning network F performs the task for the classification, the learning device 100 may map the 1-st characteristic information outputted from the learning network F onto each of classes, to thereby generate one or more probabilities of the marked training data x', for each of the classes.

Herein, the probabilities for each of the classes may represent probabilities of the 1-st characteristic information F(x'), outputted for each of the classes from the learning network F, being correct. For example, if the original training data are the facial image data, a probability of the face having a laughing expression may be outputted as 0.75, and a probability of the face not having the laughing expression may be outputted as 0.25, and the like. And, a softmax algorithm may be used for mapping the 1-st characteristic information F(x') outputted from the learning network F onto each of the classes, but the scope of the present disclosure is not limited thereto, and various algorithms may be used for mapping the 1-st characteristic information F(x') onto each of the classes.

Also, a maximum of the modified data score or the modified marked data score corresponding to the modified training data or the modified marked training data inputted into the discriminator D may be 1 as a value for determining the modified training data or the modified marked training data as real, and a minimum of the marked data score corresponding to the marked training data x' inputted into the discriminator D may be 0 as a value for determining the marked training data x' as fake. That is, the discriminator D may be learned to recognize the marked training data x' as the modified training data or the modified marked training data.

And, if the learning device 100 learns the data embedding network G such that the 1-st error is minimized and the 2-nd error is maximized, then the learning device 100 may fix and not update learned parameters of the learning network F, and may proceed with learning the data embedding network G only.

In addition, the learning device 100 may learn the data embedding network G by further referring to a similarity between the original training data x and the marked training data x', such that the similarity is minimized. That is, the similarity may be calculated by referring to the difference between the original training data x and the marked training data x', and the data embedding network G may be learned such that the similarity is minimized, and as a result, the data embedding network G may output the marked training data much different from the original training data.

According to the learning method above, the data embedding network G is learned such that the data error is minimized which is acquired by referring to an output from the learning network F, such that the marked data score of the discriminator D is maximized and/or the similarity between the original training data x and the marked training data x' is minimized, therefore, if the marked training data are generated by using the original training data x and the mark training data w, although the marked training data x' is much different from the original training data x, the learning network F may output a result calculated by using the marked training data x', which is same as or similar to that calculated by using the original training data x. That is, humans or other computing devices recognize the mark training data w from the marked training data x', however, the learning network F recognizes the original training data x, without any effect of the mark training data w on the recognition.

Figure 3:
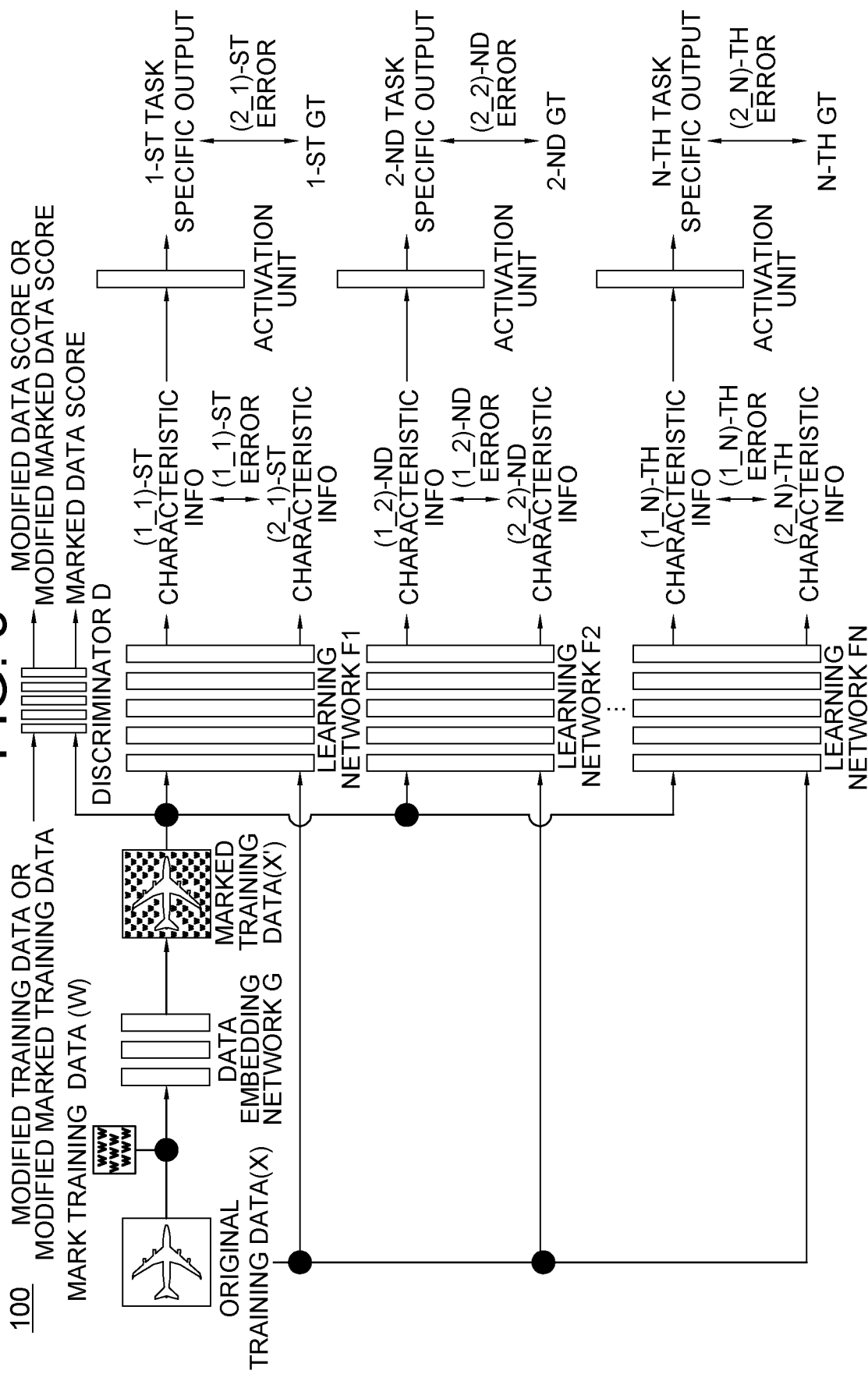
FIG. 3 is a drawing schematically illustrating another learning method for learning the data embedding network capable of generating the marked data by integrating the original data with the mark data in accordance with one example embodiment of the present disclosure.

FIG. 3 is a drawing schematically illustrating another learning method for learning the data embedding network capable of generating the marked training data by using the original training data and the mark training data in accordance with one example embodiment of the present disclosure, that is, the learning network F is configured as multiple learning network F1, F2, . . . , and Fn having their own learned parameters. Herein, each of the multiple learning networks F1, F2, . . . , and Fn may have completed learning to perform tasks at least part of which may be different from each other. In the description below, the part easily deducible from the explanation of FIG. 2 will be omitted.

First, if the original training data x and the mark training data w are acquired, the learning device 100 may input the original training data x and the mark training data w into the data embedding network G, and allow the data embedding network G to integrate the original training data x with the mark training data w and thus to generate the marked training data x', i.e., G(x,w).

Next, the learning device 100 may input the marked training data x' into each of the 1-st learning network F1 to the n-th learning network Fn, and may allow each of the 1-st learning network F1 to the n-th learning network Fn to apply its corresponding network operation to the marked training data x' using respectively the 1-st learned parameters to the n-th learned parameters of the 1-st learning network F1 to the n-th learning network Fn, and thus to generate each piece of (1_1)-st characteristic information F1(x') to (1_n)-th characteristic information Fn(x') corresponding to the marked training data x'. Also, the learning device 100 may input the original training data x into each of the 1-st learning network F1 to the n-th learning network Fn, and may allow each of the 1-st learning network F1 to the n-th learning network Fn to apply its corresponding network operation to the original training data x using respectively the 1-st learned parameters to the n-th learned parameters of the 1-st learning network F1 to the n-th learning network Fn, and thus to generate each piece of (2_1)-st characteristic information F1(x) to (2_n)-th characteristic information Fn(x) corresponding to the original training data x.

Next, the learning device 100 may learn the data embedding network G such that (i) the data error is minimized which is calculated by referring to at least part of (i-1) the 1-st error which is an average over a (1_1)-st error to a (1_n)-th error wherein the (1_1)-st error is acquired by referring to the (1_1)-st characteristic information F1(x') and the (2_1)-st characteristic information F1(x) and the (1_n)-th error is acquired by referring to the (1_n)-th characteristic information Fn(x') and the (2_n)-th characteristic information Fn(x), and (i-2) the 2-nd error which is an average over a (2_1)-st error to a (2_n)-th error wherein the (2_1)-st error is acquired by referring to at least one 1-st task specific output created by using the (1_1)-st characteristic information F1(x') and by further referring to at least one 1-st ground truth corresponding to the 1-st task specific output, and the (2_n)-th error is acquired by referring to at least one n-th task specific output created by using the (1_n)-th characteristic information Fn(x') and by further referring to at least one n-th ground truth corresponding to the n-th task specific output, and such that (ii) the marked data score is maximized which corresponds to the marked training data x' inputted into the discriminator D for determining whether the inputted data is real or fake. And the learning device 100 may learn the discriminator D such that the modified data score or the modified marked data score is maximized which corresponds to the modified training data or the modified marked training data inputted into the discriminator D, and that the marked data score is minimized.

That is, the learning device 100 may acquire the (1_1)-st error calculated by referring to the (1_1)-st characteristic information F1(x') and the (2_1)-st characteristic information F1(x), acquire the (1_2)-nd error calculated by referring to the (1_2)-nd characteristic information F2(x') and the (2_2)-nd characteristic information F2(x), and similarly acquire the (1_n)-th error calculated by referring to the (1_n)-th characteristic information Fn(x') and the (2_n)-th characteristic information Fn(x), and thus acquire the 1-st error which is an average over the acquired (1_1)-st error to the acquired (1_n)-th error. Then, the learning device 100 may acquire the (2_1)-st error calculated by referring to the 1-st task specific output created by using the (1_1)-st characteristic information F1(x') and by further referring to the 1-st ground truth corresponding to the 1-st task specific output, acquire the (2_2)-nd error calculated by referring to at least one 2-nd task specific output created by using the (1_2)-nd characteristic information F2(x') and by further referring to at least one 2-nd ground truth corresponding to the 2-nd task specific output, and similarly acquire the (2_n)-th error calculated by referring to at least one n-th task specific output created by using the (1_n)-th characteristic information Fn(x') and by further referring to at least one n-th ground truth corresponding to the n-th task specific output, and thus acquire the 2-nd error which is an average over the acquired (2_1)-st error to the acquired (2_n)-th error. And, the learning device 100 may (I) learn the data embedding network G such that at least one data error is minimized which is calculated by referring to at least part of the 1-st error and the 2-nd error, and such that at least one marked data score is maximized which corresponds to the marked training data x' inputted into the discriminator D, and (II) learn the discriminator D such that at least one modified data score or at least one modified marked data score is maximized which corresponds to the modified training data or the modified marked training data inputted into the discriminator D and such that the marked data score is minimized. Herein, the data error may be one of the 1-st error, the 2-nd error, and a sum of the 1-st error and the 2-nd error, but the scope of the present disclosure is not limited thereto.

In the above description, the learning device 100 may learn the data embedding network G such that (i) the data error is minimized which is calculated by referring to at least part of (i-1) the 1-st error which is an average over the (1_1)-st error to the (1_n)-th error wherein the (1_1)-st error is acquired by referring to the (1_1)-st characteristic information F1(x') and the (2_1)-st characteristic information F1(x) and the (1_n)-th error is acquired by referring to the (1_n)-th characteristic information Fn(x') and the (2_n)-th characteristic information Fn(x), and (i-2) the 2-nd error which is an average over the (2_1)-st error to the (2_n)-th error wherein the (2_1)-st error is acquired by referring to the 1-st task specific output created by using the (1_1)-st characteristic information F1(x') and by further referring to the 1-st ground truth corresponding to the 1-st task specific output, and the (2_n)-th error is acquired by referring to the n-th task specific output created by using the (1_n)-th characteristic information Fn(x') and by further referring to the n-th ground truth corresponding to the n-th task specific output, and such that (ii) the marked data score is maximized which corresponds to the marked training data x' inputted into the discriminator. However, as another example, the data embedding network G may be sequentially learned such that at least one 1-st data error to at least one n-th data error are minimized where the 1-st data error is calculated by referring to at least part of the (1_1)-st error and the (2_1)-st error, and the n-th data error is calculated by referring to at least part of the (1_n)-th error and the (2_n)-th error.

That is, the learning device 100 may input the original training data x and the mark training data w into the data embedding network G, and allow the data embedding network G to integrate the original training data x with the mark training data w and thus to generate 1-st marked training data x1'. And, the learning device 100 may perform or support another device to perform processes of (i) inputting the 1-st marked training data x1' into the 1-st learning network F1, and allowing the 1-st learning network F1 to apply a network operation to the 1-st marked training data x1' using the 1-st learned parameters of the 1-st learning network F1, and thus to output (1_1)-st characteristic information F1(x1') corresponding to the 1-st marked training data x1', and (ii) inputting the original training data x into the 1-st learning network F1, and allowing the 1-st learning network F1 to apply a network operation to the original training data x using the 1-st learned parameters, and thus to output the (2_1)-st characteristic information F1(x) corresponding to the original training data x. Thereafter, the learning device 100 may learn the data embedding network G, such that (i) the 1-st data error is minimized which is calculated by referring to at least part of (i-1) the (1_1)-st error acquired by referring to the (1_1)-st characteristic information F1(x1') and the (2_1)-st characteristic information F1(x), and (i-2) the (2_1)-st error acquired by referring to the 1-st task specific output generated by using the (1_1)-st characteristic information F1(x') and by further referring to the 1-st ground truth corresponding to the 1-st task specific output, and such that (ii) the 1-st marked data score is maximized which corresponds to the 1-st marked training data x1' inputted into the discriminator D, to thereby allow the data embedding network G to be a 1-st learned data embedding network G1. And the learning device 100 may learn the discriminator D, such that at least one 1-st modified data score or at least one 1-st modified marked data score is maximized which corresponds to the modified training data or the modified marked training data inputted into the discriminator D and that the 1-st marked data score is minimized, to thereby allow the discriminator D to be a 1-st learned discriminator Dl.

And, the learning device 100, while increasing an integer k from 2 to n, may repeat the processes above up to the n-th learning network Fn, to thereby acquire an n-th data embedding network Gn.

That is, the learning device 100 may input the original training data x and the mark training data w into a (k_1)-th learned data embedding network G(k_1), and allow the (k_1)-th learned data embedding network G(k_1) to integrate the original training data x with the mark training data w and thus to generate k-th marked training data xk'. And, the learning device 100 may (i) input the k-th marked training data xk' into a k-th learning network Fk, and allow the k-th learning network Fk to apply a network operation to the k-th marked training data xk' using one or more k-th learned parameters of the k-th learning network Fk, and thus to output (1_k)-th characteristic information Fk(xk') corresponding to the k-th marked training data xk', and (ii) input the original training data x into the k-th learning network Fk, and allow the k-th learning network Fk to apply a network operation to the original training data x using the k-th learned parameters, and thus to output (2_k)-th characteristic information Fk(xk) corresponding to the original training data x. Thereafter, the learning device 100 may learn the (k_1)-st learned data embedding network G(k_1), such that (i) at least one k-th data error is minimized which is calculated by referring to at least part of (i-1) at least one (1_k)-th error acquired by referring to the (1_k)-th characteristic information Fk(xk') and the (2_k)-th characteristic information Fk(x), and (i-2) at least one (2_k) k-th error acquired by referring to at least one k-th task specific output generated by using the (1_k)-th characteristic information Fk(x') and by further referring to at least one k-th ground truth corresponding to the k-th task specific output, and such that (ii) at least one k-th marked data score is maximized which corresponds to at least one k-th marked training data xk' inputted into a (k_1)-st learned discriminator D(k_1), to thereby allow the (k_1)-st learned data embedding network G(k_1) to be the k-th learned data embedding network Gk. And the learning device 100 may learn the (k_1)-st learned discriminator D(k_1), such that at least one k-th modified data score or at least one k-th modified marked data score is maximized which corresponds to the modified training data or the modified marked training data inputted into the (k_1)-st learned discriminator D(k_1) and that at least one k-th marked data score is minimized, to thereby allow the (k_1)-st learned discriminator D(k_1) to be a k-th learned discriminator Dk.

Figure 4:
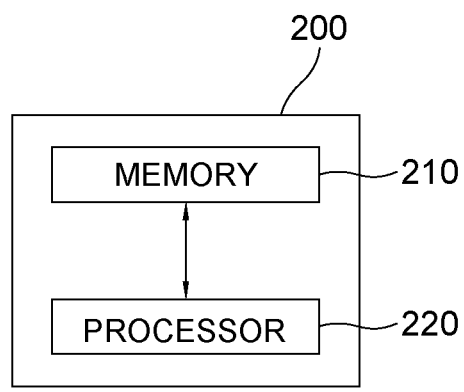
FIG. 4 is a drawing schematically illustrating a testing device for testing a learned data embedding network in accordance with one example embodiment of the present disclosure.

FIG. 4 is a drawing schematically illustrating a testing device for testing a learned data embedding network G which is the data embedding network G that has learned to generate the marked data by integrating the original data with the mark data in accordance with one example embodiment of the present disclosure.

By referring to FIG. 4, the testing device 200 in accordance with one example embodiment of the present disclosure may include a memory 210 for storing instructions to test the learned data embedding network capable of generating the marked data by using the original data and the mark data, such that the learning network outputs a result calculated by using the marked data, which is same as or similar to that calculated by using the original data, and a processor 220 for performing processes to test the learned data embedding network according to the instructions in the memory 210.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, on condition that the data embedding network has been learned according to the method as described by referring to FIGS. 2 and 3, for example, on condition that the learning device (i) if the original training data and the mark training data have been acquired, has inputted the original training data and the mark training data into the data embedding network, and has allowed the data embedding network to integrate the original training data and the mark training data and thus to generate the marked training data, (ii) (ii-1) has inputted the marked training data into the learning network having its own learned parameters, and has allowed the learning network to apply a network operation to the marked training data using the learned parameters and thus to generate the 1-st characteristic information corresponding to the marked training data, and (ii-2) has inputted the original training data into the learning network, and has allowed the learning network to apply a network operation to the original training data using the learned parameters and thus to output the 2-nd characteristic information corresponding to the original training data, (iii) has learned the data embedding network, such that the data error is minimized which is calculated by referring to at least part of (iii-1) the 1-st error acquired by referring to the 1-st characteristic information and the 2-st characteristic information and (iii-2) the 2-nd error acquired by referring to the task specific output generated by using the 1-st characteristic information and by further referring to the ground truth corresponding to the task specific output and such that the marked data score is maximized which corresponds to the marked training data inputted into the discriminator for determining whether inputted data is real or fake, and (iv) has learned the discriminator such that the modified data score or the modified marked data score is maximized which corresponds to the modified training data or the modified marked training data inputted into the discriminator and such that the marked data score is minimized, the testing device 200 may acquire original test data and mark test data which are to be integrated, may input the original test data and the mark test data into the data embedding network, and may allow the data embedding network to integrate the original test data with the mark test data using the learned parameters of the data embedding network, and thus to output marked test data.

Figure 5:
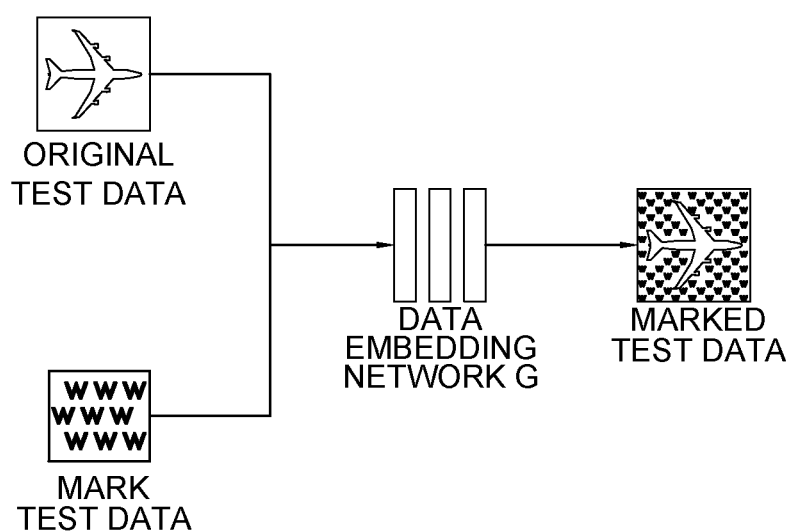
FIG. 5 is a drawing schematically illustrating a testing method for testing the learned data embedding network in accordance with one example embodiment of the present disclosure.

FIG. 5 is a drawing schematically illustrating a testing method for testing the learned data embedding network in accordance with one example embodiment of the present disclosure.

By referring to FIG. 5, on condition that the data embedding network has been learned according to the learning method as described by referring to FIGS. 2 and 3, if the original test data and the mark test data to be integrated are acquired, the testing device 200 may input the original test data and the mark test data into the data embedding network, and may allow the data embedding network to integrate the original test data with the mark test data using the learned parameters of the data embedding network, and thus to output the marked test data.

Herein, the original test data and the marked test data may be recognized as different from each other by a human or a computing device, but may be recognized as similar or same as each other by the learning network.

Meanwhile, the data embedding network may have been learned beforehand by processes similar to those in description of FIGS. 2 and 3.

As one example, the learning device may (i) if the original training data and the mark training data have been acquired, have inputted the original training data and the mark training data into the data embedding network, and have allowed the data embedding network to integrate the original training data with the mark training data and thus to generate the marked training data, (ii) have inputted the marked training data into the learning network having its own learned parameters, and have allowed the learning network to apply a network operation to the marked training data using the learned parameters and thus to generate the 1-st characteristic information corresponding to the marked training data, and have inputted the original training data into the learning network, and have allowed the learning network to apply a network operation to the original training data using the learned parameters and thus to output the 2-nd characteristic information corresponding to the original training data, (iii) have learned the data embedding network, such that the data error is minimized which is calculated by referring to at least part of (iii-1) the 1-st error acquired by referring to the 1-st characteristic information and the 2-st characteristic information and (iii-2) the 2-nd error acquired by referring to the task specific output generated by using the 1-st characteristic information and by further referring to the ground truth corresponding to the task specific output and such that the marked data score is maximized which corresponds to the marked training data inputted into the discriminator for determining whether the inputted data is real or fake, and (iv) have learned the discriminator such that the modified data score or the modified marked data score is maximized which corresponds to the modified training data or the modified marked training data inputted into the discriminator and such that the marked data score is minimized.

Also, in the above description, the learning network may include the 1-st learning network to the n-th learning network respectively having the 1-st learned parameters to the n-th learned parameters, and the learning device may (i) have inputted the marked training data into each of the 1-st learning network to the n-th learning network, and have allowed each of the 1-st learning network to the n-th learning network to (i-1) apply its corresponding network operation to the marked training data using respectively the 1-st learned parameters to the n-th learned parameters of the 1-st learning network to the n-th learning network, and thus to (i-2) output each piece of the (1_1)-st characteristic information to the (1_n)-th characteristic information on the marked training data, and (ii) have inputted the original training data into each of the 1-st learning network to the n-th learning network, and have allowed each of the 1-st learning network to the n-th learning network to (ii-1) apply its corresponding network operation to the original training data using respectively the 1-st learned parameters to the n-th learned parameters of the 1-st learning network to the n-th learning network, and thus to (ii-2) output each piece of the (2_1)-st characteristic information to the (2_n)-th characteristic information on the original training data, (iii) have learned the data embedding network such that (iii-1) the data error is minimized which is calculated by referring to at least part of (iii-1a) the 1-st error which is an average over a (1_1)-st error to a (1_n)-th error wherein the (1_1)-st error is acquired by referring to the (1_1)-st characteristic information and the (2_1)-st characteristic information, and the (1_n)-th error is acquired by referring to the (1_n)-th characteristic information and the (2_n)-th characteristic information, and (iii-1b) the 2-nd error which is an average over a (2_1)-st error to a (2_n)-th error wherein the (2_1)-st error is acquired by referring to at least one 1-st task specific output created by using the (1_1)-st characteristic information and by further referring to at least one 1-st ground truth corresponding to the 1-st task specific output, and the (2_n)-th error is acquired by referring to at least one n-th task specific output created by using the (1_n)-th characteristic information and by further referring to at least one n-th ground truth corresponding to the n-th task specific output, and such that (iii-2) the marked data score is maximized which corresponds to the marked training data inputted into the discriminator, and (iv) have learned the discriminator such that the modified data score or the modified marked data score is maximized which corresponds to the modified training data or the modified marked training data inputted into the discriminator and such that the marked data score is minimized.

Also, in the above description, the learning network may include the 1-st learning network to the n-th learning network respectively having the 1-st learned parameters to the n-th learned parameters, and the learning device may (i) have inputted the original training data and mark training data into the data embedding network, and may have allowed the data embedding network to integrate the original training data with the mark training data, and thus to generate the 1-st marked training data, (ii) have inputted the 1-st marked training data into the 1-st learning network, and have allowed the 1-st learning network to apply a network operation to the 1-st marked training data using the 1-st learned parameters of the 1-st learning network and thus to output the (1_1)-st characteristic information corresponding to the 1-st marked training data, and have inputted the original training data into the 1-st learning network, and have allowed the 1-st learning network to apply a network operation to the original training data using the 1-st learned parameters of the 1-st learning network, and thus to output the (2_1)-st characteristic information corresponding to the original training data, (iii) have learned the data embedding network, such that the 1-st data error is minimized which is calculated by referring to at least part of (iii-1) the (1_1)-st error acquired by referring to the (1_1)-st characteristic information and the (2_1)-st characteristic information, and (iii-2) the (2_1)-st error acquired by referring to the 1-st task specific output created by using the (1_1)-st characteristic information and by further referring to the 1-st ground truth corresponding to the 1-st task specific output and such that the 1-st marked data score is maximized which corresponds to the 1-st marked training data inputted into the discriminator, to thereby allow the data embedding network to be a 1-st learned data embedding network, and (iv) have learned the discriminator, such that the 1-st modified data score or the 1-st modified marked data score is maximized which corresponds to the modified training data or the modified marked training data inputted into the discriminator and such that the 1-st marked data score is minimized, to thereby allow the discriminator to be a 1-st learned discriminator. And, while increasing an integer k from 2 to n, the learning device may (i) have inputted the original training data and the mark training data into the (k_1)-st learned data embedding network, and have allowed the (k_1)-st learned data embedding network to integrate the original training data with the mark training data and thus to generate k-th marked training data, (ii) have inputted the k-th marked training data into a k-th learning network, and have allowed the k-th learning network to apply a network operation to the k-th marked training data using one or more k-th learned parameters of the k-th learning network and thus to output (1_k)-th characteristic information corresponding to the k-th marked training data, and have inputted the original training data into the k-th learning network, and have allowed the k-th learning network to apply a network operation to the original training data using the k-th learned parameters and thus to output (2_k)-th characteristic information corresponding to the original training data, (iii) have learned a (k_1)-st learned data embedding network, such that at least one k-th data error is minimized which is calculated by referring to at least part of (iii-1) at least one (1_k)-th data error acquired by referring to the (1_k)-th characteristic information and the (2_k)-th characteristic information and (iii-2) at least one (2-k)-th error acquired by referring to at least one k-th task specific output generated by using the (1_k)-th characteristic information and by further referring to at least one k-th ground truth corresponding to the k-th task specific output, and such that at least one k-th marked data score is maximized which corresponds to the k-th marked training data inputted into the (k_1)-st learned discriminator, to thereby allow the (k_1)-st learned data embedding network to be a k-th learned data embedding network, and (iv) have learned the (k_1)-st learned discriminator, such that at least one k-th modified data score or at least one k-th modified marked data score is maximized which corresponds to the modified training data or the modified marked training data inputted into the (k_1)-st learned discriminator and that the k-th marked data score is minimized, to thereby allow the (k_1)-st learned discriminator to be a k-th learned discriminator.

Meanwhile, the marked data generated from integrating the original data with the mark data by the data embedding network in accordance with the present disclosure may be provided or sold to a buyer of image big data.

In this case, since the marked data which is generated in accordance with the present disclosure has the mark data integrated into itself, its buyer cannot copy the marked data easily, and even if the marked data is illegally shared with a third party, it can be easily tracked. Also, in accordance with the present disclosure, the marked data may be recognized as data different from the original data by a human, but may be recognized as data similar or same as the original data by the learning network.

Meanwhile, the "average" mentioned in this specification may represent a weighted average but it is not limited thereto.

The present disclosure has an effect of easily identifying an origin of a data by processing data, for example, digitally watermarking the data.

The present disclosure has another effect of acquiring a first result generated by applying machine-learning operation to the processed data acuiqred by inserting mark data into original data, wherein the first result is same as or similar to a second result generated by applying the machine-learning operation to the original data.

The present disclosure has still another effect of acquiring a result such that the original data and the processed data are recognized as different by a human, but recognized as same or similar by a computer.

The present disclosure has still yet another effect of supporting trading or sharing data by data providers in a big data trading market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning a data embedding network capable of integrating original data with mark data to thereby generate marked data, the method comprising steps of:
(a) a learning device, upon acquiring original training data and mark training data:
inputting the original training data and the mark training data into the data embedding network, and
allowing the data embedding network to integrate the original training data with the mark training data and thus to generate marked training data;
(b) the learning device:
inputting the marked training data into a learning network having one or more learned parameters,
allowing the learning network to apply a network operation to the marked training data using the learned parameters and thus to generate first characteristic information corresponding to the marked training data, inputting the original training data into the learning network, and allowing the learning network to apply a network operation to the original training data using the learned parameters and thus to generate second characteristic information corresponding to the original training data; and (c) the learning device:

learning the data embedding network such that:

at least one data error is minimized, the at least one data error being calculated by referring to at least part of at least one first error acquired by referring to the first characteristic information and the second characteristic information, and at least one second error acquired by referring to at least one task specific output generated by using the first characteristic information and by further referring to at least one ground truth corresponding to the task specific output, and at least one marked data score is maximized which corresponds to the marked training data inputted into a discriminator for determining whether inputted data is real or fake, and learning the discriminator such that at least one modified data score or at least one modified marked data score is maximized, respectively corresponding to modified training data or modified marked training data inputted into the discriminator, and such that the marked data score is minimized, wherein the modified training data or the modified marked training data is generated respectively by modifying the original training data or the marked training data.

2. The method of claim 1, wherein the learning network includes a first learning network to an n-th learning network respectively having one or more first learned parameters to one or more n-th learned parameters, n being an integer greater than 0, the inputting the marked training data includes the learning device:

inputting the marked training data into each of the first learning network to the n-th learning network, and allowing each of the first learning network to the n-th learning network to apply its corresponding network operation to the marked training data using respectively the first learned parameters to the n-th learned parameters of the first learning network to the n-th learning network, and thus to output n pieces of the first characteristic information on the marked training data, and inputting the original training data into each of the first learning network to the n-th learning network, and allows each of the first learning network to the n-th learning network to apply its corresponding network operation to the original training data using respectively the first learned parameters to the n-th learned parameters, and thus to output n pieces of the second characteristic information on the original training data, wherein in a case that n equals 1, the first characteristic information output from the learning network equals a first piece of the first characteristic information output from the first learning network, and the second characteristic information output from the learning network equals a first piece of the second characteristic information output from the first learning network, and in a case that n is larger than 1, the first characteristic information output from the learning network includes the first piece of the first characteristic information to an n-th piece of the first characteristic information, respectively output from the first learning network to the n-th learning network, and the second characteristic information output from the learning network includes the first piece of the second characteristic information to an n-th piece of the second characteristic information, respectively output from the first learning network to the n-th learning network, and at the step of learning the data embedding network, the learning device:

learns the data embedding network such that the data error is minimized which is calculated by referring to at least part of the first error and the second error, wherein in a case that n equals 1, the first error equals a first sub-error, which is acquired by referring to the first piece of the first characteristic information and the first piece of the second characteristic information, in the case that n equals 1, the second error equals a second sub-error, which is acquired by referring to at least one first task specific output created by using the first piece of the first characteristic information and by further referring to at least one first ground truth corresponding to the first task specific output, in a case that n is larger than 1, the first error is an average over the first sub-error to an n-th sub-error, wherein the n-th sub-error is acquired by referring to the n-th piece of the first characteristic information and the n-th piece of the second characteristic information, and in the case that n is larger than 1, the second error which is an average over the second sub-error to an n-th sub-error, wherein the n-th sub-error is acquired by referring to at least one n-th task specific output created by using the n-th piece of the first characteristic information and by further referring to at least one n-th ground truth corresponding to the n-th task specific output, and such that the marked data score is maximized which corresponds to the marked training data inputted into the discriminator, and learns the discriminator such that the modified data score or the modified marked data score is maximized which respectively corresponds to the modified training data or the modified marked training data inputted into the discriminator and that the marked data score is minimized.

3. The method of claim 1, wherein the learning network includes a first learning network to an n-th learning network respectively having one or more first learned parameters to one or more n-th learned parameters, n being an integer greater than 0, the learning device inputs the original training data and the mark training data into the data embedding network, and allows the data embedding network to integrate the original training data with the mark training data to generate first marked training data, the inputting the marked training data includes the learning device:
  inputting the first marked training data into the first learning network, and allowing the first learning network to
    apply a network operation to the first marked training data using the first learned parameters of the first learning network and thus to
    output a first piece of the first characteristic information on the first marked training data, and
  inputting the original training data into the first learning network, and allowing the first learning network to
    apply a network operation to the original training data using the first learned parameters, and thus to
    outputting a second piece of the first characteristic information on the original training data, the learning the data embedding network includes the learning device learning the data embedding network, such that
  at least one first data error is minimized which is calculated by referring to at least part of at least one first sub-error of the first data error and at least one second sub-error of the first data error, the first sub-error error acquired by referring to the first piece of the first characteristic information and the second piece of the first characteristic information, and the second sub-error error acquired by referring to at least one first task specific output generated by using the first piece of the first characteristic information and by further referring to at least one first ground truth corresponding to the first task specific output, and
  at least one first marked data score is maximized which corresponds to the first marked training data inputted into the discriminator, to thereby allow the data embedding network to be a first learned data embedding network, and the learning the discriminator is performed such that
  at least one first modified data score or at least one first modified marked data score is maximized which respectively corresponds to the modified training data or the modified marked training data inputted into the discriminator, and
  the first marked data score is minimized, to thereby allow the discriminator to be a first learned discriminator, and the method further comprises, while increasing an integer k from 2 to n, the learning device:
  inputting the original training data and the mark training data into a k-th first learned data embedding network, and allowing the k-th first learned data embedding network to integrate the original training data with the mark training data and thus to generate k-th marked training data,
  inputting the k-th marked training data into a k-th learning network, and allowing the k-th learning network to apply a network operation to the k-th marked training data using one or more k-th learned parameters of the k-th learning network and thus to output a first piece of k-th characteristic information corresponding to the k-th marked training data, and inputs the original training data into the k-th learning network, and allows the k-th learning network to apply a network operation to the original training data using the k-th learned parameters and thus to output a second piece of the k-th characteristic information corresponding to the original training data,
  learning a k-th first learned data embedding network, such that at least one k-th data error is minimized which is calculated by referring to at least part of
    at least one first sub-error of the k-th data error acquired by referring to the first piece of the k-th characteristic information and the second piece of the k-th characteristic information, and
    at least one second sub-error of the k-th error acquired by referring to at least one k-th task specific output generated by using the first piece of the k-th characteristic information and by further referring to at least one k-th ground truth corresponding to the k-th task specific output, and such that at least one k-th marked data score is maximized which corresponds to the k-th marked training data inputted into a k-th first learned discriminator, to thereby allow the k-th first learned data embedding network to be a k-th learned data embedding network, and
  learning the k-th first learned discriminator, such that at least one k-th modified data score or at least one k-th modified marked data score is maximized which respectively corresponds to the modified training data or the modified marked training data inputted into the k-th piece first learned discriminator and that the k-th marked data score is minimized, to thereby allow the k-th first learned discriminator to be a k-th learned discriminator.

4. The method of claim 1, wherein
a maximum of the at least one modified data score or the at least one modified marked data score respectively corresponding to the modified training data or the modified marked training data inputted into the discriminator is 1 as a value for determining the modified training data or the modified marked training data as real, and
a minimum of the at least one marked data score corresponding to the marked training data inputted into the discriminator is 0 as a value for determining the marked training data as fake.

5. The method of claim 1, wherein the learning the data embedding network includes the learning device acquiring the first error by referring to a difference between the first characteristic information and the second characteristic information, and acquiring the second error by referring to at least one loss created by using the task specific output and the ground truth.

6. The method of claim 5, wherein the learning device acquires the first error by referring to a norm or a cosine similarity between the first characteristic information and the second characteristic information.

7. The method of claim 1, wherein the learning device learns the data embedding network by further referring to a similarity between the original training data and the marked training data, such that the similarity is minimized.

8. A method for testing a learned data embedding network capable of integrating original data with mark data to thereby generate marked data, the method comprising steps of:
  (a) on condition that a learning device has performed processes of:
    upon acquisition of original training data and mark training data, inputting the original training data and the mark training data into a data embedding network, and allowing the data embedding network to integrate the original training data and the mark training data and thus to generate marked training data, inputting the marked training data into a learning network having its own learned parameters, and allowing the learning network to apply a network operation to the marked training data using the learned parameters and thus to generate first characteristic information corresponding to the marked training data, and inputting the original training data into the learning network, and allowing the learning network to apply a network operation to the original training data using the learned parameters and thus to output second characteristic information corresponding to the original training data, learning the data embedding network, such that at least one data error is minimized which is calculated by referring to at least part of at least one first error acquired by referring to the first characteristic information and the second characteristic information, and at least one second error acquired by referring to at least one task specific output generated by using the first characteristic information and by further referring to at least one ground truth corresponding to the task specific output and such that at least one marked data score is maximized which corresponds to the marked training data inputted into a discriminator for determining whether inputted data is real or fake, and learning the discriminator such that at least one modified data score or at least one modified marked data score is maximized, respectively corresponding to modified training data or modified marked training data inputted into the discriminator, and such that the marked data score is minimized, wherein the modified training data or the modified marked training data is generated respectively by modifying the original training data or the marked training data, performing a process, by a testing device, of acquiring original test data and mark test data to be integrated; and (b) inputting, by the testing device, the original test data and the mark test data into the data embedding network, and allowing the data embedding network to integrate the original test data with the mark test data using one or more learned parameters of the data embedding network and thus to generate marked test data.

9. The method of claim 8, wherein the learning network includes a first learning network to an n-th learning network respectively having one or more first learned parameters to one or more n-th learned parameters, n being an integer greater than 0, and the learning device performs processes of inputting the marked training data into each of a first learning network to an n-th learning network, and allowing each of the first learning network to the n-th learning network to apply its corresponding network operation to the marked training data using respectively one or more first learned parameters to one or more n-th learned parameters of the first learning network to the n-th learning network, and thus to output one or more pieces of first characteristic information corresponding to the marked training data, and inputting the original training data into each of the first learning network to the n-th learning network, and allowing each of the first learning network to the n-th learning network to apply its corresponding network operation to the original training data using respectively the first learned parameters to the n-th learned parameters of the first learning network to the n-th learning network, and thus to output one or more pieces of second characteristic information corresponding to the original training data, wherein in a case that n equals 1, the first characteristic information output from the learning network equals a first piece of the first characteristic information output from the first learning network, and the second characteristic information output from the learning network equals a first piece of the second characteristic information output from the first learning network, and in a case that n is larger than 1, the first characteristic information output from the learning network includes the first piece of the first characteristic information to a n-th piece of the first characteristic information, respectively output from the first learning network to the n-th learning network, and the second characteristic information output from the learning network includes the first piece of the second characteristic information to a n-th piece of the second characteristic information, respectively output from the first learning network to the n-th learning network, learning the data embedding network such that the data error is minimized which is calculated by referring to at least part of the first error and the second error, wherein in a case that n equals 1, the first error equals a first sub-error, which is acquired by referring to the first piece of the first characteristic information and the first piece of the second characteristic information, in the case that n equals 1, the second error equals a second sub-error, which is acquired by referring to at least one first task specific output created by using the first piece of the first characteristic information and by further referring to at least one first ground truth corresponding to the first task specific output, in a case that n is larger than 1, the first error is an average over at least one first sub-error to at least one n-th sub-error of the first error, wherein the n-th sub-error of the first error is acquired by referring to n-th piece of the first characteristic information and n-th piece of the second characteristic information, and in a case that n is larger than 1, the second error is an average over a second sub-error to a n-th sub-error of the second error, wherein the n-th sub-error of the second error is acquired by referring to at least one n-th task specific output created by using the n-th piece of the first characteristic information and by further referring to at least one n-th ground truth corresponding to the n-th task specific output, and such that the marked data score is maximized which corresponds to the marked training data inputted into the discriminator, and learning the discriminator such that the modified data score or the modified marked data score is maximized which respectively corresponds to the modified training data or the modified marked training data inputted into the discriminator, and such that the marked data score is minimized.

10. The method of claim 8, wherein the learning network includes a first learning network to an n-th learning network respectively having one or more first learned parameters to one or more n-th learned parameters, n being an integer greater than 0, and the learning device performs processes of:

inputting the original training data and the mark training data into the data embedding network, and allowing the data embedding network to integrate the original training data and the mark training data, and thus to generate first marked training data, inputting the first marked training data into the first learning network, and allowing the first learning network to apply a network operation to the first marked training data using the first learned parameters of the first learning network and thus to output first piece of the first characteristic information corresponding to the first marked training data, inputting the original training data into the first learning network, and allowing the first learning network to apply a network operation to the original training data using the first learned parameters of the first learning network, and thus to output first piece of the second characteristic information corresponding to the original training data, learning the data embedding network, such that the first data error is minimized which is calculated by referring to at least part of first sub-error and second sub-error, the first sub-error acquired by referring to the first piece of the first characteristic information and the first piece of the second characteristic information, and the second sub-error error acquired by referring to the first task specific output created by using the first piece of the first characteristic information and by further referring to the first ground truth corresponding to the first task specific output and such that the first marked data score is maximized which corresponds to the first marked training data inputted into the discriminator, to thereby allow the data embedding network to be a first learned data embedding network, learning the discriminator, such that at least one first modified data score or at least one first modified marked data score is maximized which respectively corresponds to the modified training data or the modified marked training data inputted into the discriminator and such that the first marked data score is minimized, to thereby allow the discriminator to be a first learned discriminator, while increasing an integer k from 2 to n, inputting the original training data and the mark training data into a k-th first learned data embedding network, and allowing the k-th first learned data embedding network to integrate the original training data with the mark training data and thus to generate k-th marked training data, inputting the k-th marked training data into a k-th learning network, and allowing the k-th learning network to apply a network operation to the k-th marked training data using one or more k-th learned parameters of the k-th learning network and thus to output a first piece of k-th characteristic information corresponding to the k-th marked training data, and inputting the original training data into the k-th learning network, and allowing the k-th learning network to apply a network operation to the original training data using the k-th learned parameters and thus to output a second piece of the k-th characteristic information corresponding to the original training data, learning a k-th first learned data embedding network, such that at least one k-th data error is minimized which is calculated by referring to at least part of at least one first sub-error of k-th data error and at least one second sub-error of the k-th data error, the at least one first sub-error of k-th data error acquired by referring to the first piece of k-th characteristic information and the second piece of the k-th characteristic information, and the at least one second sub-error of the k-th error acquired by referring to at least one k-th task specific output generated by using the first piece of k-th characteristic information and by further referring to at least one k-th ground truth corresponding to the k-th task specific output, and such that at least one k-th marked data score is maximized which corresponds to the k-th marked training data inputted into a k-th first learned discriminator, to thereby allow the k-th first learned data embedding network to be a k-th learned data embedding network, and learning the k-th first learned discriminator, such that at least one k-th modified data score or at least one k-th modified marked data score is maximized which respectively corresponds to the modified training data or the modified marked training data inputted into the k-th first learned discriminator and such that the k-th marked data score is minimized, to thereby allow the k-th first learned discriminator to be a k-th learned discriminator.

11. The method of claim 8, wherein a maximum of the at least one modified data score or the at least one modified marked data score respectively corresponding to the modified training data or the modified marked training data inputted into the discriminator is 1 as a value for determining the modified training data or the modified marked training data as real, and a minimum of the at least one marked data score corresponding to the marked training data inputted into the discriminator is 0 as a value for determining the marked training data as fake.

12. The method of claim 8, wherein the learning device acquires the first error by referring to a difference between the first characteristic information and the second characteristic information, and acquires the second error by referring to at least one loss created by using the task specific output and the ground truth.

13. The method of claim 12, wherein the learning device acquires the first error by referring to a norm or a cosine similarity between the first characteristic information and the second characteristic information.

14. The method of claim 8, wherein the learning device learns the data embedding network by further referring to a similarity between the original training data and the marked training data, such that the similarity is minimized.

15. A learning device for learning a data embedding network capable of integrating original data with mark data to thereby generate marked data, the learning device comprising:
at least one memory that stores instructions; and
at least one processor configured to execute the instructions to perform or support another device to perform processes of:
upon acquisition of original training data and mark training data, inputting the original training data and the mark training data into the data embedding network,
allowing the data embedding network to integrate the original training data with the mark training data and thus to generate marked training data,
inputting the marked training data into a learning network having its own one or more learned parameters,
allowing the learning network to apply a network operation to the marked training data using the learned parameters and thus to generate first characteristic information corresponding to the marked training data,
inputting the original training data into the learning network,
allowing the learning network to apply a network operation to the original training data using the learned parameters and thus to generate second characteristic information corresponding to the original training data,
learning the data embedding network such that:
at least one data error is minimized, the at least one data error being calculated by referring to at least part of
at least one first error acquired by referring to the first characteristic information and the second characteristic information, and
at least one second error acquired by referring to at least one task specific output generated by using the first characteristic information and by further referring to at least one ground truth corresponding to the task specific output, and
at least one marked data score is maximized which corresponds to the marked training data inputted into a discriminator for determining whether inputted data is real or fake, and
learning the discriminator such that at least one modified data score or at least one modified marked data score is maximized, respectively corresponding to modified training data or modified marked training data inputted into the discriminator, and such that the marked data score is minimized, wherein the modified training data or the modified marked training data is generated respectively by modifying the original training data or the marked training data.

16. The learning device of claim 15, wherein
the learning network includes a first learning network to an n-th learning network respectively having one or more first learned parameters to one or more n-th learned parameters, n being an integer greater than 0,
to input the marked training data, the processor:
inputs the marked training data into each of the first learning network to the n-th learning network, and allows each of the first learning network to the n-th learning network to
apply its corresponding network operation to the marked training data using respectively the first learned parameters to the n-th learned parameters of the first learning network to the n-th learning network, and thus to
output one or more pieces of first characteristic information on the marked training data, and
inputs the original training data into each of the first learning network to the n-th learning network, and allows each of the first learning network to the n-th learning network to
apply its corresponding network operation to the original training data using respectively the first learned parameters to the n-th learned parameters, and thus to
output one or more pieces of second characteristic information on the original training data, wherein
in a case that n equals 1, the first characteristic information output from the learning network equals a first piece of the first characteristic information output from the first learning network, and the second characteristic information output from the learning network equals a first piece of the second characteristic information output from the first learning network, and
in a case that n is larger than 1, the first characteristic information output from the learning network includes the first piece of the first characteristic information to a n-th piece of the first characteristic information, respectively output from the first learning network to the n-th learning network, and the second characteristic information output from the learning network includes the first piece of the second characteristic information to a n-th piece of the second characteristic information, respectively output from the first learning network to the n-th learning network, and
to learn the data embedding network, the processor:
learns the data embedding network such that the data error is minimized which is calculated by referring to at least part of the first error and the second error, wherein
in a case that n equals 1, the first error equals a first sub-error, which is acquired by referring to the first piece of the first characteristic information and the first piece of the second characteristic information,
in the case that n equals 1, the second error equals a second sub-error, which is acquired by referring to at least one first task specific output created by using the first piece of the first characteristic information and by further referring to at least one first ground truth corresponding to the first task specific output,
in a case that n is larger than 1, the first error is an average over the first sub-error to a n-th sub-error of the first error, wherein the n-th sub-error of the first error is acquired by referring to the n-th piece of the first characteristic information and the n-th piece of the second characteristic information, and
in the case that n is larger than 1, the second error which is an average over a second sub-error to a n-th sub-error of the second error, wherein the n-th sub-error of the second error is acquired by referring to at least one n-th task specific output created by using the n-th piece of the first characteristic information and by further referring to at least one n-th ground truth corresponding to the n-th task specific output, and such that the marked data score is maximized which corresponds to the marked training data inputted into the discriminator, and learns the discriminator such that the modified data score or the modified marked data score is maximized which corresponds to the modified training data or the modified marked training data inputted into the discriminator and that the marked data score is minimized.

17. The learning device of claim 15, wherein the learning network includes a first learning network to an n-th learning network respectively having one or more first learned parameters to one or more n-th learned parameters, n being an integer greater than 0, to input the original training data and the mark training data, the processor inputs the original training data and the mark training data into the data embedding network, and allows the data embedding network to integrate the original training data with the mark training data and thus to generate first marked training data, to input the marked training data into a learning network, the processor:
  inputs the first marked training data into the first learning network, and allows the first learning network to
    apply a network operation to the first marked training data using the first learned parameters of the first learning network and thus to
    output first piece of the first characteristic information on the first marked training data, and
  inputs the original training data into the first learning network, and allows the first learning network to
    apply a network operation to the original training data using the first learned parameters and thus to
    output first piece of the second characteristic information on the original training data, the processor learns the data embedding network such that
  at least one first data error is minimized which is calculated by referring to at least part of at least one first sub-error and at least one second sub-error, the
    at least one first sub-error acquired by referring to the first piece of the first characteristic information and the first piece of the second characteristic information, and the at least one second sub-error acquired by referring to at least one first task specific output generated by using the first piece of the first characteristic information and by further referring to at least one first ground truth corresponding to the first task specific output, and
  at least one first marked data score is maximized which corresponds to the first marked training data inputted into the discriminator, to thereby allow the data embedding network to be a first learned data embedding network, and learns the discriminator, such that
  at least one first modified data score or at least one first modified marked data score is maximized which corresponds to the modified training data or the modified marked training data inputted into the discriminator, and that
  the first marked data score is minimized, to thereby allow the discriminator to be a first learned discriminator, and while increasing an integer k from 2 to n, the processor:
  inputs the original training data and the mark training data into the k-th first learned data embedding network, and allows the k-th first learned data embedding network to integrate the original training data with the mark training data and thus to generate k-th marked training data,
  inputs the k-th marked training data into a k-th learning network, and allows the k-th learning network to apply a network operation to the k-th marked training data using one or more k-th learned parameters of the k-th learning network and thus to output first piece of k-th characteristic information corresponding to the k-th marked training data, and inputs the original training data into the k-th learning network, and allows the k-th learning network to apply a network operation to the original training data using the k-th learned parameters and thus to output second piece of the k-th characteristic information corresponding to the original training data,
  learns a k-th first learned data embedding network, such that at least one k-th data error is minimized which is calculated by referring to at least part of
    at least one first sub-error of k-th data error acquired by referring to the first piece of k-th characteristic information and the second piece of the k-th characteristic information and
    at least one second sub-error of the k-th error acquired by referring to at least one k-th task specific output generated by using the first piece of k-th characteristic information and by further referring to at least one k-th ground truth corresponding to the k-th task specific output, and such that at least one k-th marked data score is maximized which corresponds to the k-th marked training data inputted into the k-th first learned discriminator, to thereby allow the k-th first learned data embedding network to be a k-th learned data embedding network, and
  learns the k-th first learned discriminator, such that at least one k-th modified data score or at least one k-th modified marked data score is maximized which corresponds to the modified training data or the modified marked training data inputted into the k-th first learned discriminator and that the k-th marked data score is minimized, to thereby allow the k-th first learned discriminator to be a k-th learned discriminator.

18. The learning device of claim 15, wherein
  a maximum of the at least one modified data score or the at least one modified marked data score respectively corresponding to the modified training data or the modified marked training data inputted into the discriminator is 1 as a value for determining the modified training data or the modified marked training data as real, and
  a minimum of the at least one marked data score corresponding to the marked training data inputted into the discriminator is 0 as a value for determining the marked training data as fake.

19. The learning device of claim 15, wherein the processor acquires the first error by referring to difference between the first characteristic information and the second characteristic information, and acquires the second error by referring to at least one loss created by using the task specific output and the ground truth.

20. The learning device of claim 19, wherein the processor acquires the first error by referring to a norm or a cosine similarity between the first characteristic information and the second characteristic information.

21. The learning device of claim 15, wherein the processor learns the data embedding network by further referring to a similarity between the original training data and the marked training data, such that the similarity is minimized.

22. A testing device for testing a learned data embedding network capable of integrating original data with mark data to thereby generate marked data, the testing device comprising:
- at least one memory that stores instructions; and
- at least one processor configured to execute the instructions to perform or support another device to perform first processes on condition that a learning device has performed second processes of:
  - upon acquisition of original training data and mark training data, inputting the original training data and the mark training data into a data embedding network, and allowing the data embedding network to integrate the original training data and the mark training data and thus to generate marked training data,
  - inputting the marked training data into a learning network having its own learned parameters, and allowing the learning network to apply a network operation to the marked training data using the learned parameters and thus to generate first characteristic information corresponding to the marked training data, and inputting the original training data into the learning network, and allowing the learning network to apply a network operation to the original training data using the learned parameters and thus to output second characteristic information corresponding to the original training data,
  - learning the data embedding network, such that at least one data error is minimized which is calculated by referring to at least part of
    - at least one first error acquired by referring to the first characteristic information and the second characteristic information, and
    - at least one second error acquired by referring to at least one task specific output generated by using the first characteristic information and by further referring to at least one ground truth corresponding to the task specific output and such that at least one marked data score is maximized which corresponds to the marked training data inputted into a discriminator for determining whether inputted data is real or fake, and
  - learning the discriminator such that at least one modified data score or at least one modified marked data score is maximized which corresponds to modified training data or modified marked training data inputted into the discriminator and such that the marked data score is minimized wherein the modified training data or the modified marked training data is generated respectively by modifying the original training data or the marked training data,
the first processes including:
  - acquiring original test data and mark test data to be integrated; and
  - inputting the original test data and the mark test data into the data embedding network, and allowing the data embedding network to integrate the original test data with the mark test data using one or more learned parameters of the data embedding network and thus to generate marked test data.

23. The testing device of claim 22, wherein
the learning network includes a first learning network to an n-th learning network respectively having one or more first learned parameters to one or more n-th learned parameters, n being an integer greater than 0, and
the learning device performs processes of
  inputting the marked training data into each of a first learning network to an n-th learning network, and allowing each of the first learning network to the n-th learning network to
    apply its corresponding network operation to the marked training data using respectively one or more first learned parameters to one or more n-th learned parameters of the first learning network to the n-th learning network, and thus to
    output one or more pieces of first characteristic information corresponding to the marked training data, and
  inputting the original training data into each of the first learning network to the n-th learning network, and allowing each of the first learning network to the n-th learning network to
    apply its corresponding network operation to the original training data using respectively the first learned parameters to the n-th learned parameters of the first learning network to the n-th learning network, and thus to
    output one or more pieces of second characteristic information corresponding to the original training data, wherein
    in a case that n equals 1, the first characteristic information output from the learning network equals a first piece of the first characteristic information output from the first learning network, and the second characteristic information output from the learning network equals a first piece of the second characteristic information output from the first learning network, and
    in a case that n is larger than 1, the first characteristic information output from the learning network includes the first piece of the first characteristic information to a n-th piece of the first characteristic information, respectively output from the first learning network to the n-th learning network, and the second characteristic information output from the learning network includes the first piece of the second characteristic information to a n-th piece of the second characteristic information, respectively output from the first learning network to the n-th learning network,
  learning the data embedding network such that the data error is minimized which is calculated by referring to at least part of the first error and the second error, wherein
    in a case that n equals 1, the first error equals a first sub-error, which is acquired by referring to the first piece of the first characteristic information and the first piece of the second characteristic information, in the case that n equals 1, the second error equals a second sub-error, which is acquired by referring to at least one first task specific output created by using the first piece of the first characteristic information and by further referring to at least one first ground truth corresponding to the first task specific output, in a case that n is larger than 1, the first error is an average over at least one first sub-error to at least one n-th sub-error of the first error, wherein the n-th sub-error of the first error is acquired by referring to n-th piece of the first characteristic information and n-th piece of the second characteristic information, and in a case that n is larger than 1, the second error is an average over a second sub-error to a n-th sub-error of the second error, wherein the n-th sub-error of the second error is acquired by referring to at least one n-th task specific output created by using the n-th piece of the first characteristic information and by further referring to at least one n-th ground truth corresponding to the n-th task specific output, and such that the marked data score is maximized which corresponds to the marked training data inputted into the discriminator, and learning the discriminator such that the modified data score or the modified marked data score is maximized which corresponds to the modified training data or the modified marked training data inputted into the discriminator, and such that the marked data score is minimized.

24. The testing device of claim 22, wherein
the learning network includes a first learning network to an n-th learning network respectively having one or more first learned parameters to one or more n-th learned parameters, n being an integer greater than 0, and the learning device performs processes of:
inputting the original training data and the mark training data into the data embedding network, and allowing the data embedding network to integrate the original training data and the mark training data, and thus to generate first marked training data, inputting the first marked training data into the first learning network, and allowing the first learning network to apply a network operation to the first marked training data using the first learned parameters of the first learning network and thus to output first piece of the first characteristic information corresponding to the first marked training data, inputting the original training data into the first learning network, and allowing the first learning network to apply a network operation to the original training data using the first learned parameters of the first learning network, and thus to output first piece of the second characteristic information corresponding to the original training data, learning the data embedding network, such that
the first data error is minimized which is calculated by referring to at least part of first sub-error and second sub-error, the first sub-error acquired by referring to the first piece of the first characteristic information and the first piece of the second characteristic information, and the second sub-error error acquired by referring to the first task specific output created by using the first piece of the first characteristic information and by further referring to the first ground truth corresponding to the first task specific output and such that the first marked data score is maximized which corresponds to the first marked training data inputted into the discriminator, to thereby allow the data embedding network to be a first learned data embedding network, learning the discriminator, such that at least one first modified data score or at least one first modified marked data score is maximized which respectively corresponds to the modified training data or the modified marked training data inputted into the discriminator and such that the first marked data score is minimized, to thereby allow the discriminator to be a first learned discriminator, while increasing an integer k from 2 to n,
inputting the original training data and the mark training data into a k-th first learned data embedding network, and allowing the k-th first learned data embedding network to integrate the original training data with the mark training data and thus to generate k-th marked training data, inputting the k-th marked training data into a k-th learning network, and allowing the k-th learning network to apply a network operation to the k-th marked training data using one or more k-th learned parameters of the k-th learning network and thus to output first piece of k-th characteristic information corresponding to the k-th marked training data, and inputting the original training data into the k-th learning network, and allowing the k-th learning network to apply a network operation to the original training data using the k-th learned parameters and thus to output second piece of the k-th characteristic information corresponding to the original training data, learning a k-th first learned data embedding network, such that at least one k-th data error is minimized which is calculated by referring to at least part of at least one first sub-error of k-th data error and at least one second sub-error of the k-th data error, the at least one first sub-error of k-th data error acquired by referring to the first piece of k-th characteristic information and the second piece of the k-th characteristic information, and the at least one second sub-error of the k-th error acquired by referring to at least one k-th task specific output generated by using the first piece of k-th characteristic information and by further referring to at least one k-th ground truth corresponding to the k-th task specific output, and such that at least one k-th marked data score is maximized which corresponds to the k-th marked training data inputted into a k-th first learned discriminator, to thereby allow the k-th first learned data embedding network to be a k-th learned data embedding network, and learning the k-th first learned discriminator, such that at least one k-th modified data score or at least one k-th modified marked data score is maximized which respectively corresponds to the modified training data or the modified marked training data inputted into the k-th first learned discriminator and such that the k-th marked data score is minimized, to thereby allow the k-th first learned discriminator to be a k-th learned discriminator.

25. The testing device of claim 22, wherein
- a maximum of the at least one modified data score or the at least one modified marked data score respectively corresponding to the modified training data or the modified marked training data inputted into the discriminator is 1 as a value for determining the modified training data or the modified marked training data as real, and
- a minimum of the at least one marked data score corresponding to the marked training data inputted into the discriminator is 0 as a value for determining the marked training data as fake.

26. The testing device of claim 22, wherein, the learning device acquires the first error by referring to difference between the first characteristic information and the second characteristic information, and acquires the second error by referring to at least one loss created by using the task specific output and the ground truth.

27. The testing device of claim 26, wherein the learning device acquires the first error by referring to a norm or a cosine similarity between the first characteristic information and the second characteristic information.

28. The testing device of claim 22, wherein the learning device learns the data embedding network by further referring to a similarity between the original training data and the marked training data, such that the similarity is minimized.

* * * * *